(12) United States Patent
Vick

(10) Patent No.: US 7,260,870 B2
(45) Date of Patent: Aug. 28, 2007

(54) ASSOCIATED STRAP OF A COMPOSITE RESTRAINT SYSTEM FOR SECURING FREIGHT

(76) Inventor: Wayne E. Vick, 1248 Haywood Valley Rd., Armuchee, GA (US) 30105

( * ) Notice: Subject to any disclaimer, the term of this patent is extended or adjusted under 35 U.S.C. 154(b) by 0 days.

(21) Appl. No.: 10/767,531

(22) Filed: Jan. 29, 2004

(65) Prior Publication Data

US 2004/0185738 A1    Sep. 23, 2004

Related U.S. Application Data

(62) Division of application No. 09/991,106, filed on Nov. 16, 2001, now Pat. No. 6,758,644.

(51) Int. Cl.
*B65D 63/14* (2006.01)
(52) U.S. Cl. ...................................................... 24/16 R
(58) Field of Classification Search ................ 24/16 R, 24/17 R, 17 AP, 17 A
See application file for complete search history.

(56) References Cited

U.S. PATENT DOCUMENTS

| | | |
|---|---|---|
| 301,940 A | 7/1884 | Wall |
| 2,269,286 A | 1/1942 | Ott |
| 2,547,457 A | 4/1951 | Ghertman |
| 2,934,318 A | 4/1960 | Schultz |
| 3,848,889 A | 11/1974 | Sharrow |
| 3,897,919 A | 8/1975 | Weingarten |
| 3,910,558 A | 10/1975 | Brucker et al. |
| 3,998,304 A | 12/1976 | Edgerton, Jr. et al. |
| 4,111,132 A | 9/1978 | Plut |
| 4,199,182 A | 4/1980 | Sunesson et al. |
| 4,264,251 A | 4/1981 | Blatt |

(Continued)

FOREIGN PATENT DOCUMENTS

DE        3206394        11/1982

(Continued)

OTHER PUBLICATIONS

"Intermodal Loading Guide for Products in Closed Trailers and Containers," Circular No. 43-C, Pamphlet No. 45, BOE Pamphlet No. 6C, p. 2-32, 4-23.1, 4-23.2, 4-102, 4-103, 4-92, 4-93, 4-78, 4-79, Issued Jul. 1998, revised Feb. 1997, Mar. 1998, issued by Association of American Railroads, Washington, DC USA.

*Primary Examiner*—James R Brittain
(74) *Attorney, Agent, or Firm*—Kilpatrick Stockton LLP

(57) ABSTRACT

A composite restraint system composed of a composite restraint strap, a patch and a tensioning tool for restraining freight during transportation. The composite restraint strap includes a first layer and a second layer. The first layer includes a plurality of strands of yarn having a specified percentage of elongation before breaking and a specified creep. The second layer includes a nonwoven fabric. The composite restraint strap is capable of being attached to a floor or a wall of a transportation device in order to restrain the freight from movement. The composite restraint strap is typically tightened across the freight using the tensioning tool and held in place during transportation with the patch having a permanent-type adhesive for preventing the taut composite restraint strap from losing tension. The patch may be pre-attached to a strap prior to installation around freight.

8 Claims, 21 Drawing Sheets

U.S. PATENT DOCUMENTS

| | | |
|---|---|---|
| 4,542,883 A | 9/1985 | Rutzki et al. |
| 4,846,610 A | 7/1989 | Schoenleben |
| 4,913,608 A | 4/1990 | Royball |
| 4,964,771 A | 10/1990 | Callihan |
| 5,187,840 A | 2/1993 | Kaczorowski |
| 5,219,251 A | 6/1993 | Kanczuzewski |
| 5,479,681 A | 1/1996 | Muraoka |
| 5,516,244 A | 5/1996 | Baka |
| 5,548,878 A | 8/1996 | Romagnoli |
| 5,747,131 A * | 5/1998 | Kreckel .................... 428/40.1 |
| 5,784,761 A | 7/1998 | Allen |
| 6,089,802 A | 7/2000 | Bullock |
| 6,227,779 B1 | 5/2001 | Bullock |
| 6,247,208 B1 | 6/2001 | Creech |
| 6,478,229 B1 * | 11/2002 | Epstein ...................... 235/492 |
| 6,499,723 B1 | 12/2002 | McNarry et al. |
| 6,547,218 B2 | 4/2003 | Landy |
| 6,758,644 B1 | 7/2004 | Vick |

FOREIGN PATENT DOCUMENTS

| | | |
|---|---|---|
| EP | 0733460 | 11/1982 |
| EP | 0256175 | 2/1988 |
| GB | 2148436 A | 5/1985 |
| WO | WO9503443 A1 | 2/1995 |
| WO | WO9961209 | 12/1999 |
| WO | WO 0185490 | 11/2001 |

* cited by examiner

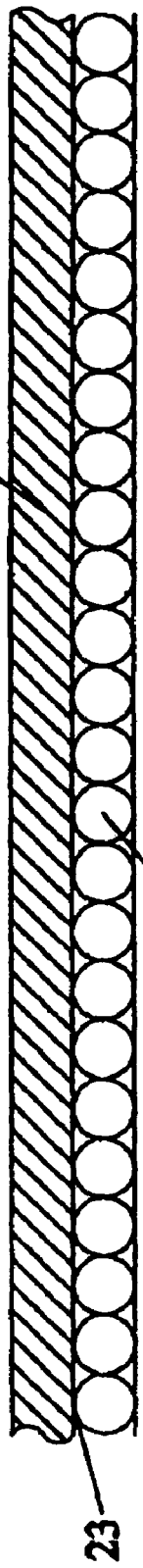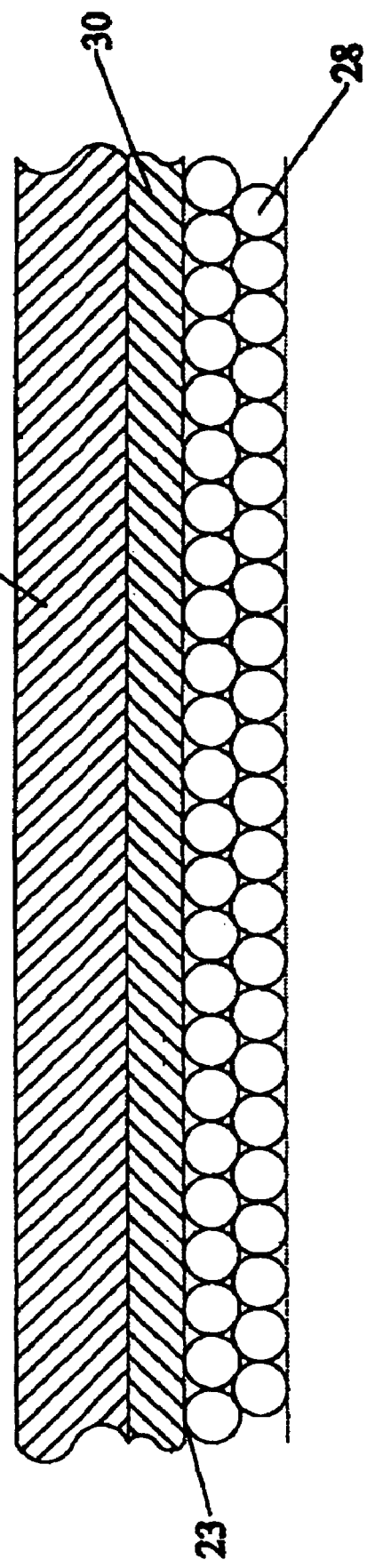

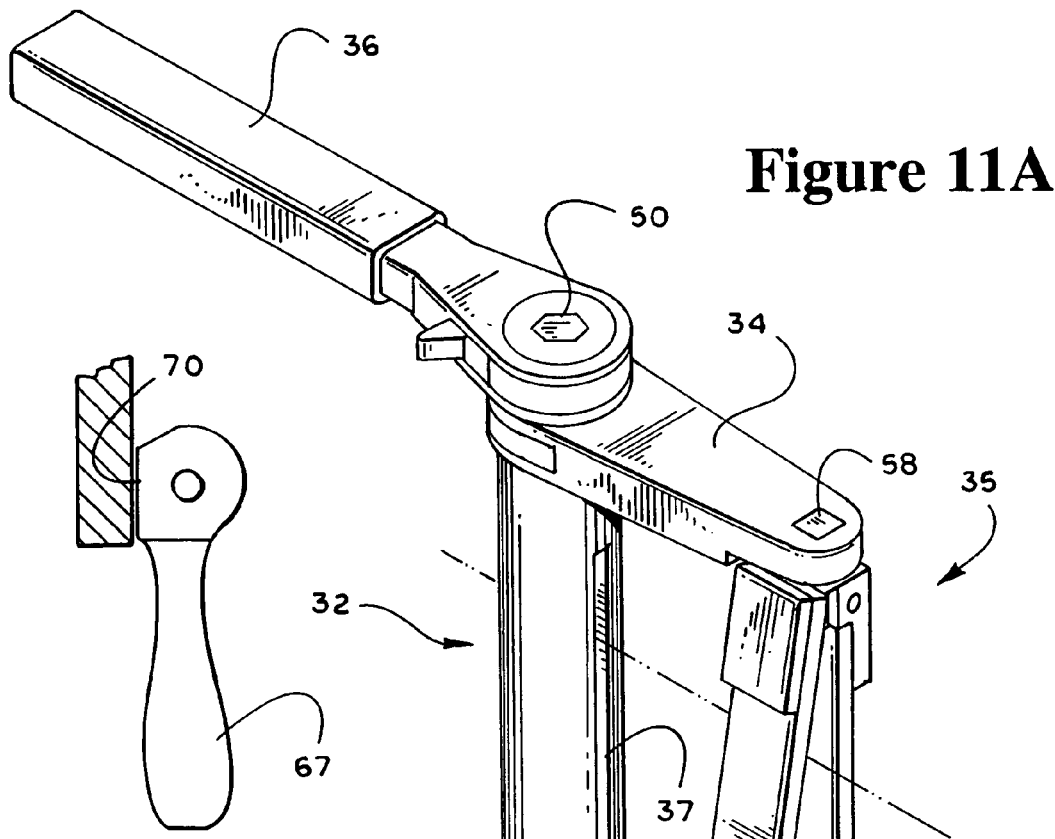
Figure 11A
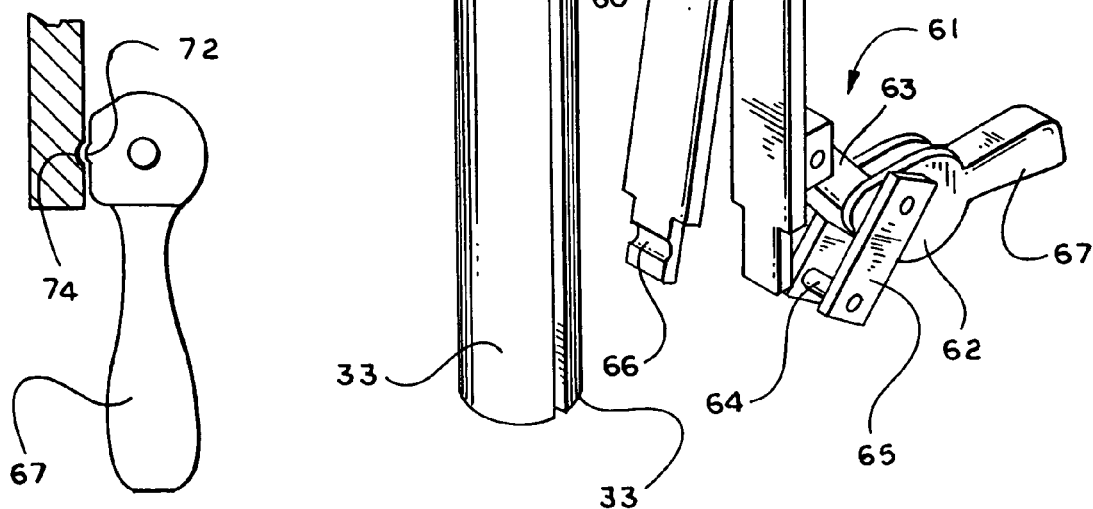
Figure 11B
Figure 11C

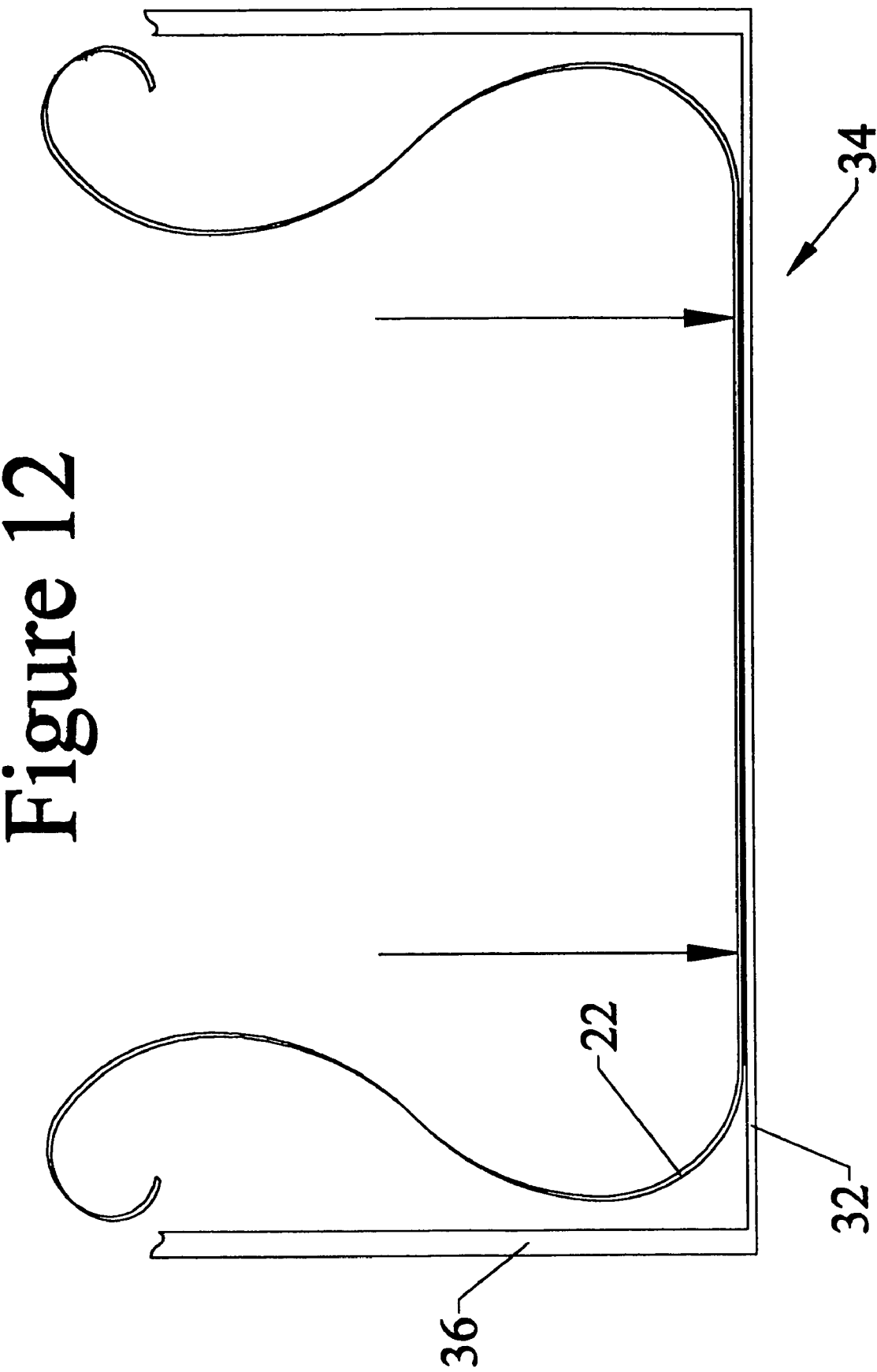

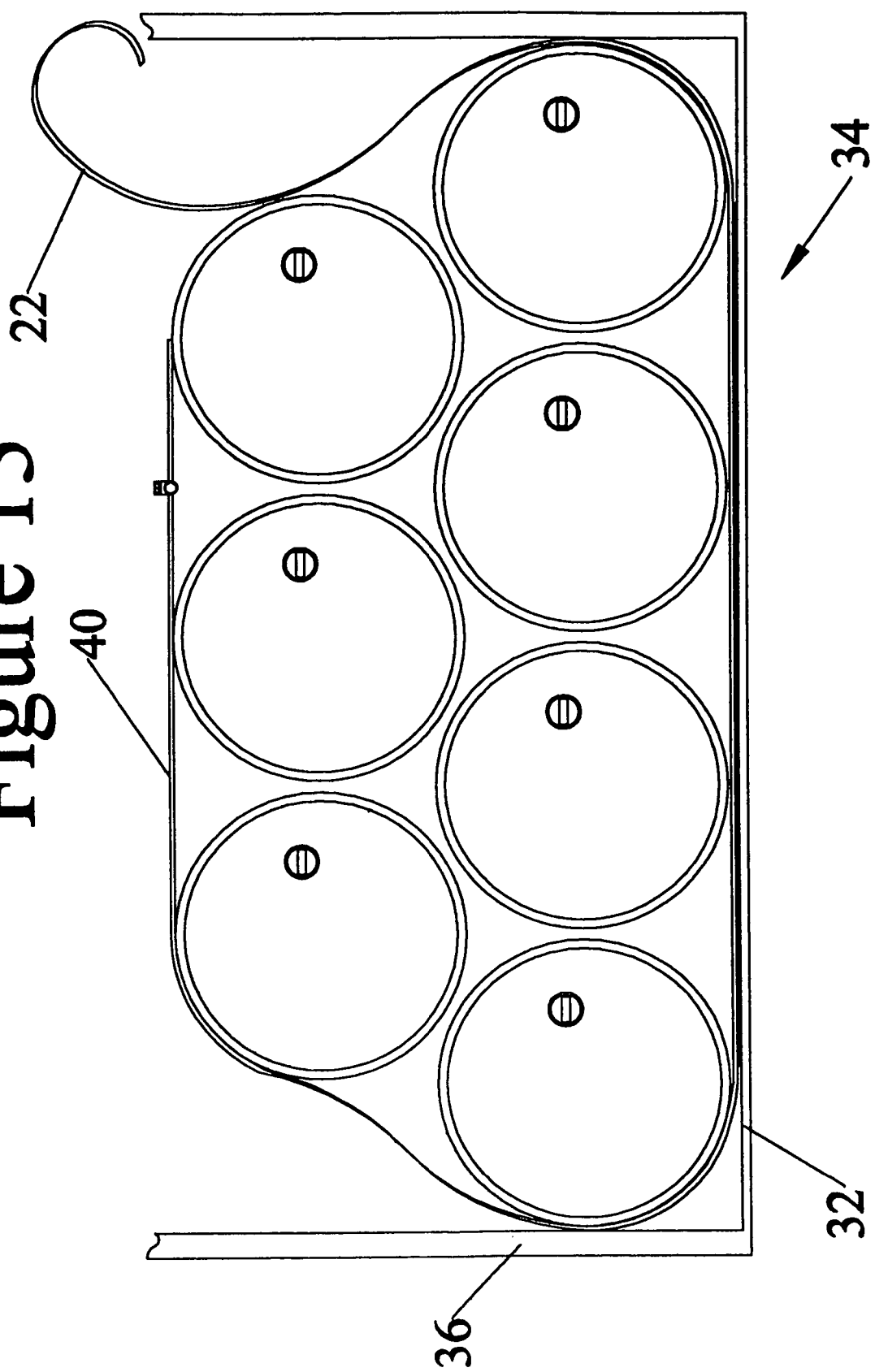

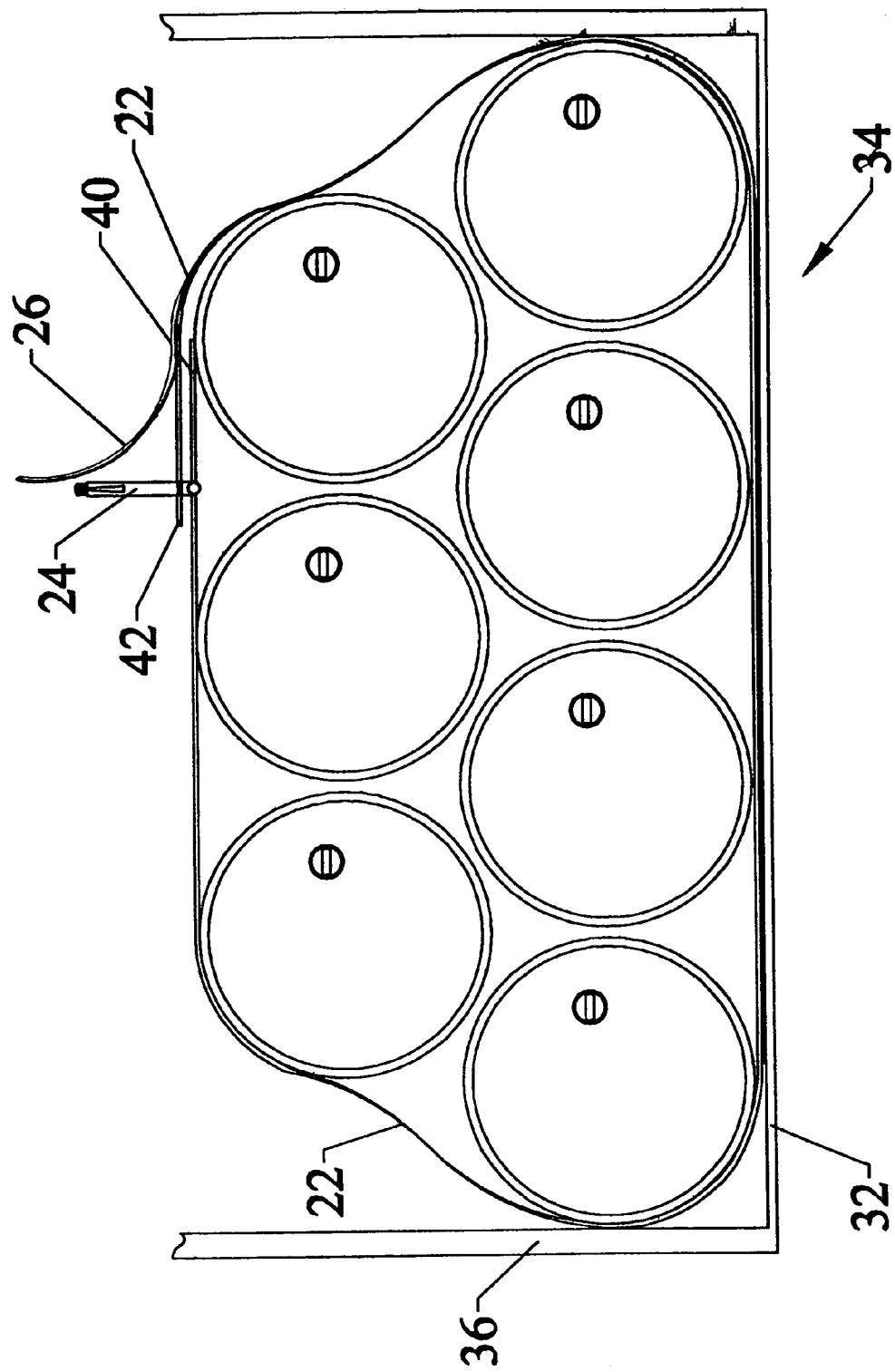

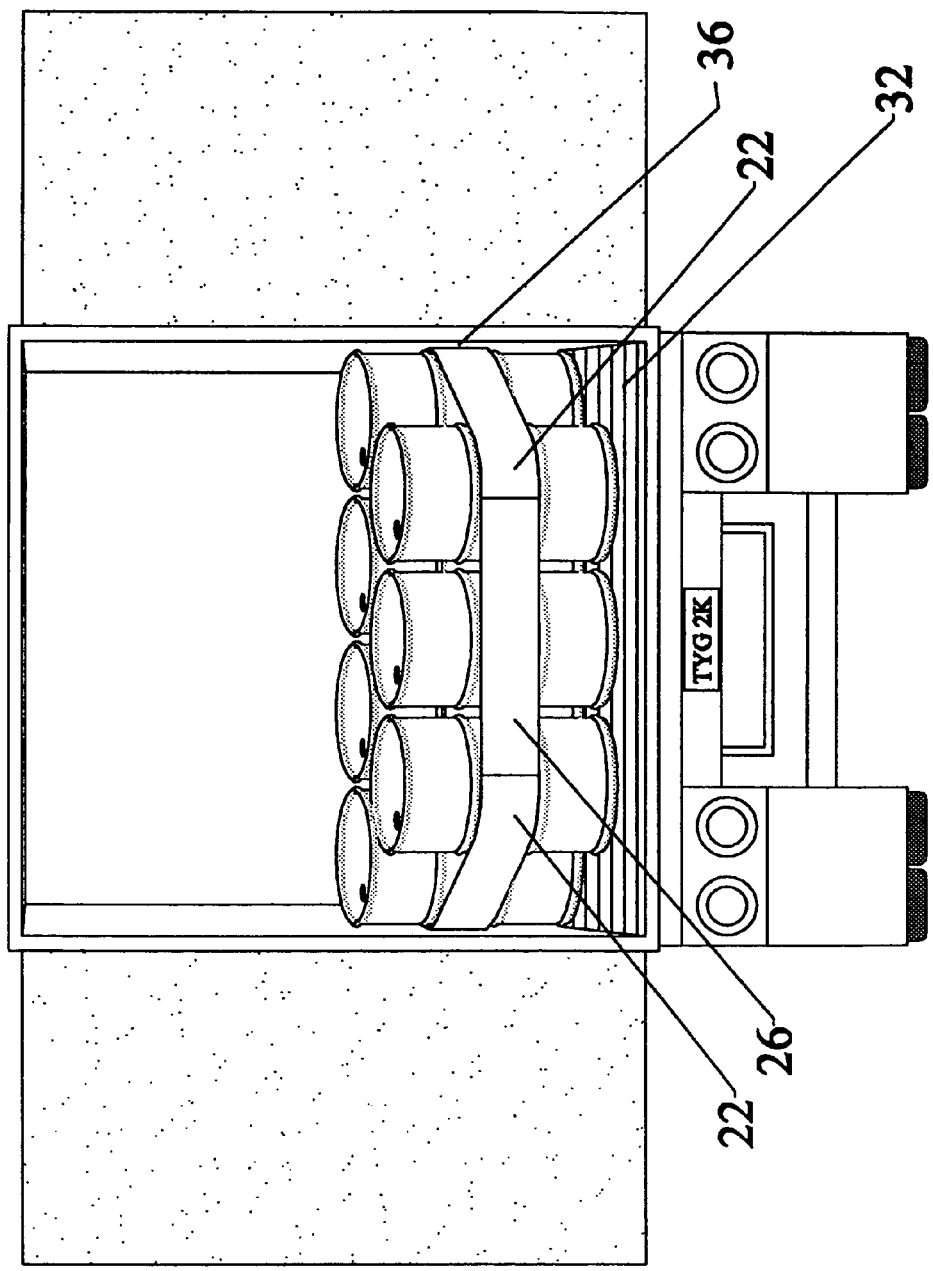

ASSOCIATED STRAP OF A COMPOSITE RESTRAINT SYSTEM FOR SECURING FREIGHT

RELATED APPLICATIONS

This application is a divisional of U.S. application Ser. No. 09/991,106, entitled "Composite Restraint System for Securing Freight," filed Nov. 16, 2001, issued as U.S. Pat. No. 6,758,644, which is incorporated herein by reference.

FIELD OF THE INVENTION

The invention is directed generally to a system for restraining freight, and more particularly, to a composite restraint system capable of restraining freight from movement during transportation that includes at least a strap and a tensioning tool.

BACKGROUND

Throughout history, society has transported merchandise and personal effects from one locale to another for a variety of reasons. These items have been transported through a variety of transportation mechanisms including containers, such as trunks, baskets, suitcases, boxes, and numerous other custom shipping devices. As time has progressed and transportation modes, such as the automobile, train, airplane, and ship, have undergone dynamic changes in the name of efficiency and progress. Likewise, technology surrounding freight restraint systems has progressed in an effort to accommodate the increased rates of speed of transportation and the increased demands of the customers.

While large pieces of freight may be transported through many different methods methods, today it has become common to transport freight within intermodal containers or flat bed trailers. Intermodal containers typically are twenty to forty feet in length by eight to ten feet in width by seven to nine feet in height. Intermodal containers have become an integral part of the transportation industry because of their convenience and adaptability. Specifically, intermodal containers may be stacked upon each other on the deck of a cargo ship, mounted on wheel structures for land transportation, or mounted on flat deck train cars, thereby enabling intermodal containers to transport freight via land, sea, or rail.

While intermodal containers bridge the gap between transportation via land, sea or rail, the containers fail to provide adequate means for securing the pieces of freight located therein. Specifically, most freight possess exterior dimensions that do not make them readily available to be positioned tightly within the interior surfaces of an intermodal container. For instance, a typical twenty foot long intermodal container may hold eighty fifty-five gallon barrels double-stacked within its interior compartment. In this position, approximately one to two inches exist between the rearward-most surface of the freight and the interior surface of the doors. While this small amount of space appears to be insignificant and undeserving of attention, just the opposite is the case, primarily because of the importance of restraining freight from moving to prohibit damage and to comply with regulations, such as United States Federal Regulation 49 C.F.R. 176.76, Oct. 1, 2000, requiring that freight traveling by vessel be secured to prevent movement in any direction. Further, other regulations (like United States Federal Regulation 49 C.F.R. 176.834, Oct. 1, 2000), requires that hazardous materials transported on public highways be secured against movement.

When containers change direction or speed, the freight contained therein continue along the previously established path until contacting the interior surface of the container and thereby forcing it to change direction. Without some type of restraint or cushioning system, the freight builds up considerable momentum independent of the container. When the freight contacts an interior surface of the intermodal container, the momentum possessed by the freight creates a force that is absorbed by the freight. Such absorption of the force may damage the freight, the packaging surrounding the freight or the walls of the intermodal container. Damaging the shipping containers may cause a release of hazardous materials. Accordingly, it is undesirable to permit freight to gain momentum independent of the intermodal container.

The transportation industry has addressed this issue by attempting to restrict freight from moving by using numerous methods. For instance, freight has been secured through lumber bracing and load-locking. Load-locking freight entails placing wood between the rear doors of the intermodal container and the freight and between the sides of the intermodal container and the freight. Typically, construction of the wood bracing is not performed by employees of the transporter; rather, the construction is outsourced to carpentry crews—a process that has proven to be costly and time inefficient. Further, wooden supports are often brittle and unable to absorb the forces developed during transportation. Additionally, as loads shift during transit, bracing often falls from its position to the floor and is rendered useless. Moreover, traditional load-locking using lumber bracing is not capable of being used for all freight. For instance, positioning eighty fifty-five gallon drums within a typical intermodal container does not allow enough space between the rearward surface of the drums and the interior surface of the doors of the intermodal container. Thus, the method of load-locking using lumber bracing is fraught with shortcomings.

Another attempt of restraining freight is disclosed within U.S. Pat. No. 4,264,251. The 251 patent discloses an invention which is composed of sealing strips that are adhered to opposing sides of a container, a strip of bracing material and an adjoining mechanism used to bind the ends of the strips together into a secure and taut restraint. The disclosure of this patent is hereby incorporated into this application by reference.

While the 251 patent solved some of the problems associated with the previous methods employed for bracing freight, it did not solve all of the problems and at times created other problems. For instance, the 251 patent discloses a method of securing freight within an intermodal container by applying strips of material to the walls of the intermodal container using an adhesive that is applied separately. Installation of these strips of material is labor intensive and costly as regulation of the amount of adhesive placed on each strip is not easily controlled. Further, the juncture where the strips contact one another provide an opportunity for slippage because of inherent weakness in the design. Moreover, these strips of material are prone to elongate when subject to a force. Specifically, these strips are prone to elongating about 23 percent when subjected to a force, as evidenced by testing conducted by the Bureau of Explosives and reported in the Bureau's Intermodal Loading Guide, Circular No. 43-C, Pamphlet No. 45, BOE Pamphlet No. 6C, Last Revised March 1998 (hereinafter, BOE Pamphlet).

An additional disadvantage of the prior art is that the tools used to secure the strips of material around a load of freight require two or more people to use. Typically, the tools include a cylindrical shaft having a slot for receiving the material. The tool is used to tighten strips of material around a load of freight by first positioning ends of the material within the slot. The tool is then rotated using a wrench. A ratchet holds the tool in this position and prohibits it from unwinding during the tightening process. Thus, the ratchet allows the tool to be rotated but prevents it from unwinding. Typically, a head of the ratchet is attached to the tool at a first end, and a second end of the ratchet, located opposite the first end, is positioned so that it bears against the freight. In this position, a single person can tighten the strips of material around the load of freight. However, a single person cannot attach a patch over the intersection between the two strips of material because as the ratchet bears against the load of freight after the material has been tightened, the forces generated by the tool and translated to the ratchet arm cause the tool to be pushed away from the freight. As a result, a second person is needed to push the tool in contact with the freight while another person affixes a patch across the intersection.

Thus, a need exists for a device capable of restraining freight during transportation from movement in all directions and capable of being attached to a variety of surfaces. Further, a need exists for a device having the ability to return to its original shape and location after absorbing a force. In addition, a need exists for a restraint system which employs an efficient method of using restraint straps. Finally, a need exists for a tool capable of being used by a single person to tighten strips of material around freight and to affix the strips in this position.

SUMMARY OF THE INVENTION

Set forth below is a brief summary of the invention that solves the foregoing problems and provides benefits and advantages in accordance with the purposes of the present invention as embodied and broadly described herein. This invention is directed to a composite restraint system capable of restricting freight from movement in all directions during transportation via ship, land or rail. The composite restraint system includes a composite restraint strap, a composite restraint patch and a tensioning tool. In addition, the composite restraint system includes a strap having a pre-attached patch. In another embodiment, the invention includes a composite restraint strap having at least one pre-attached reinforcement strap.

The composite restraint strap is composed of at least two layers. A first layer is composed of a high strength yarn which has a certain percentage of recovery and elongation. A second layer preferably includes spunbonded fibers. The yarn forming the first layer is typically adhered to the second layer using an adhesive. Each strand of yarn is adhered to the second layer parallel to the longitudinal axis of the second layer. The composite restraint patch is composed of materials capable of restraining the strap during use.

The composite restraint strap may be adhered to a floor of a transportation device using an adhesive that is capable of adhering to unclean surfaces composed of materials including, but not limited to, painted surfaces, fiberglass, plastics, metals, and wood. In one embodiment of the composite restraint system, a composite restraint strap is used to restrain a load of freight by first adhering the composite restraint strap to the floor of the transportation device. The freight is placed on top of the restraint strap and each end of the restraint strap is brought over the freight. In this position, the strap contacts each side of the freight and the ends of the strap overlap. A tensioning tool is used to tighten the composite restraint strap around the freight by rotating an end of the strap around a body having at least one slot for receiving the strap. The tensioning tool is rotated using a wrench, ratchet, or some other tension arm. Once taut, a patch is placed over the overlapping ends of the composite restraint strap. The patch may be composed of materials such as a woven fabric, a nonwoven fabric, or the composite material set forth above. The patch prevents the first and second ends of the composite restraint strap from substantial movement relative to each other through the use of a permanent-type pressure sensitive adhesive. After the patch has been installed over the intersection between the first and second ends of the composite restraint strap, the tensioning tool is removed from its position on the composite restraint strap.

In another embodiment, the patch is pre-attached to an end of the composite restraint strap before installation around freight. In this embodiment, the strap may be a woven fabric, a non-woven fabric or a composite material as set forth above. The patch may be attached to the end of the strap prior to use of the strap to make it easier for personnel to install and tighten the strap around freight. In this embodiment, the patch is attached to the strap at a contact section.

Connecting the composite restraint patch to the composite restraint strap before application simplifies the installation process. In particular, the individual installing the composite restraint does not have to first adhere a patch to the first end of the strap. Instead, the patch has already been attached to the strap. This feature greatly reduces that probability of ruining a patch before it is used.

In another embodiment, a patch is not necessary to secure a strap around a load of freight. Instead, a first end of the strap can be secured to an opposite end using adhesives placed on the first end. In this embodiment, an adhesive can be applied to the first end before or during installation. If applied before installation, a releasable film can be used to prevent the adhesive from adhering to items unintentionally.

In addition to restraining freight from vertical movement by securing freight to the floor of a transportation device, the composite restraint strap may restrain freight from lateral and longitudinal movement by securing the freight to the side walls of the transportation device. In this application, a composite restraint strap is adhered to side walls of the transportation device through an adhesive capable of adhering to surfaces such as, but not limited to metal, wood, plastics, fiberglass, and painted surfaces. The composite restraint strap may include an adhesive on one surface of the strap together with a releasable film to protect the adhesive from adhering to surfaces or itself prior to being installed on the side wall of the transportation device. Installation of the strap proceeds in the same fashion as described above.

This invention also includes a mechanism for tightening the straps described above around a load of freight. This mechanism is a tensioning tool that includes a body having at least one slot for receiving a strap and a clamp having clamp arms for receiving another end of a strap. The tool permits a single person to tighten at least one strap around a load of freight because the clamp arms hold one end of the strap while the other end is tightened around the outside surface of the body of the tool. Specifically, the clamp arms of the clamp hold one end of a strap using a cam mechanism that holds the arms tight against each other. While the clamp holds one end of a strap, the other end is inserted into a slot within the body of the tool and rotated until tight. Once tight, the strap is held in this position using a patch or another end of the strap described above, and the tool is removed. Thus, a single person can install the straps described above without assistance from another individual.

In another embodiment of the invention, the composite restraint strap can further include at least one reinforcement strap. The reinforcement strap can be positioned generally parallel to a longitudinal axis of the composite restraint strap and can be attached to an edge of the composite restraint strap. During use, the reinforcement strap can be attached with another end of a reinforcement strap using a buckle.

This invention aims to achieve at least one of the following advantages:

An advantage of this invention is that the composite restraint strap possesses a small percentage of creep after elongation that prevents the composite restraint straps from becoming slack due to over-elongation after absorbing a force during use.

Another advantage of this invention is that the small amount of creep eliminates the need for tape or other means for securing restraint straps in place to avoid sagging of the restraint straps in the event that the pieces of freight are compressed during transportation. In other words, many straps known in the art require that pieces of tape be used to hold a strap in position in the event that the strap elongates and fails to recover, thereby forming slack in the strap. This fact is evidenced by the BOE Pamphlet that describes loading procedures and states that strapping should be taped to the intermediate bulk containers to prevent sagging if it becomes slack in transit. Without the pieces of tape in position on the strap, the strap would fall out of position. In contrast, the small amount of creep inherent within the instant invention eliminates this need to hold the strap in position. This advantage reduces the material costs involved with shipping freight, reduces labor costs associated with placing pieces of tape on the straps, and reduces the cost of replacement of freight damaged as a result of straps sliding off of the cargo.

Yet another advantage of this invention is that the composite restraint strap may be positioned around certain goods so that only select goods may be removed at a certain delivery location without having to re-secure the freight remaining within the container that is to be delivered at another location.

Still another advantage of the present invention is that the dimension of the composite restraint strap is typically less than the width of the straps previously used in the transportation industry, thereby reducing costs and making installation and storage easier.

Yet another advantage of the present invention is that the composite strap system requires less material and less adhesive to properly secure freight because the strap is smaller in size and the adhesive is more efficiently positioned on each strap based on each customer's requirements.

Still another advantage of the present invention is that the non-releasable adhesive used together with the patch holds the straps together with greater strength. Further, the non-releasable adhesive does not release the two straps when subjected to an impact as happens with the adhesives previously used.

Yet another advantage of the present invention is that the strength of the composite restraint strap may be increased or decreased according to the customer or industry requirements by changing the denier of the fiber used without changing the performance of the belt. Building the strap to accommodate a particular anticipated load leads to cost savings on raw materials and manufacturing costs.

Still another advantage of this invention is the ability to restrain freight from moving in all directions in compliance with United States regulations.

Yet another advantage of the present invention is that freight may be restrained from vertical movement resulting from harmonic vibrations created in trailers used on the highway or created by road obstructions, such as potholes or speed breakers.

Still another advantage of the present invention is that the adhesive allows the composite restraint straps to be fastened to steel, wood, plastics, fiberglass, painted surfaces, and unclean surfaces.

These and other features and advantages of the present invention will become apparent after review of the following drawings and detailed description of the disclosed embodiments.

BRIEF DESCRIPTION OF THE DRAWINGS

The accompanying drawings, which are incorporated in and form a part of the specification, illustrate preferred embodiments of the present invention and, together with the description, disclose the principles of the invention.

FIG. 2 is a cross-sectional view of a composite restraint strap.

FIG. 3 is a cross-sectional view of a composite restraint strap together with an adhesive layer.

FIG. 1D is an exploded perspective view of the tensioning tool shown in FIGS. 11A through 11C.

FIG. 12 through FIG. 15 shows a composite restraint strap being positioned around freight in order to secure the freight to the floor of a transportation device.

FIG. 17 shows a transportation device containing a load of freight that is retained using a plurality of straps attached to side walls of the intermodal container.

DETAILED DESCRIPTION OF THE DRAWINGS

Figure 1:
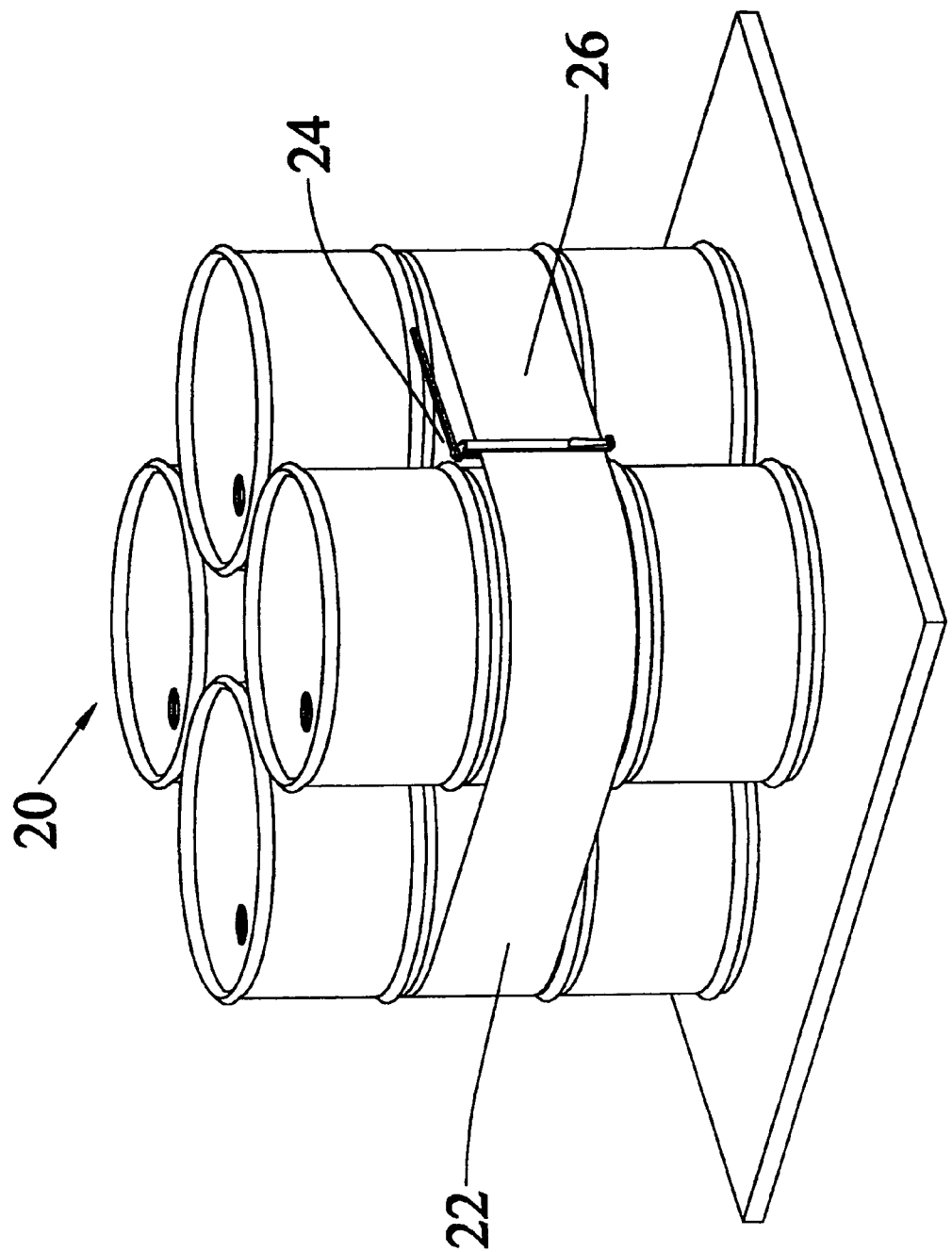
FIG. 1 is a perspective view of a composite restraint system, including a composite restraint strap and a tensioning tool, restraining freight on a flat bed trailer.

Referring now to the drawings wherein like numerals represent the same or equivalent structure and, in particular, to FIG. 1 of the drawings, there is illustrated a composite restraint system 20 according to the present invention that restrains freight during transportation. More particularly, the composite restraint system 20 is capable of restraining freight to a floor of a transportation device through adherence to the floor, as shown in FIGS. 12-16. The composite restraint system 20 includes at least one composite restraint strap 22 and a tensioning tool 24, as shown in FIG. 1. Each composite restraint strap 22 is capable of restraining freight around the freight alone; to the side walls or floor of a transportation device, or both. Typically, the transportation device is composed of an intermodal container; however, the transportation device may include, but is not limited to, a flat bed trailer, a straight truck, or a pallet. Further, the composite restraint system 20 may be used to secure freight when transported through means including, but not limited to, vehicles, trains, or ships.

I. Composite Restraint Strap

FIG. 2 shows that composite restraint strap 22 is formed of a first layer 28 and a second layer 30. In one embodiment of the invention, the combined thickness of the first layer 28 and the second layer 30 is within the range of 0.005 inches and 0.025 inches, and preferably about 0.017 inches. The first layer 28 is held in contact with the second layer 30. The first layer 28 and the second layer 30 may be held in contact with each other through use of an adhesive, thermal bonding or other conventional manner.

A plurality of strands of yarn positioned on the second layer 30 forms first layer 28. The yarn strands may be positioned parallel to the longitudinal axis of the second layer 30. Further, the strands of yarn may be on top of each other, as shown in FIG. 3, or side-by-side and touching each other. Alternatively, the strands may be positioned side-by-side, but not in contact with each other. Rather, a space may be located between at least two of the strands. The strands of yarn may be adhered to the second layer using any appropriate adhesive 23. Alternatively, the adhesive 23 used may be a wheat-based adhesive of mild strength.

The pre-tensioned yarn possesses properties including a certain elongation percentage, denier and creep. Denier is defined as a measure of the fineness of filament yarns; creep is defined as the amount of elongation that is permanent and not recoverable; and elongation percentage means the percentage of elongation present in a material after it has been taken to break. In the preferred embodiment, a yarn having a denier of 1500 is used. However, yarns having other deniers can be used and, for some applications, are preferable to a yarn having a denier of 1500. A preferred yarn having a denier of 1500 has an elongation percentage of ranging from about 2.5% to about 3.9%, with a target of about 3.2% prior to failure. Additionally, the yarn having a denier of 1500 further includes a creep of less than about 2 percent at 20 percent of breaking load after 4.5 hours, a maximum elongation at break of about 9.8%, a break load of about 26.6 pounds, a hot air shrinkage at 350° F. of about 8.4%, a stretch percentage of about 3.9 and a shrinkage force at 350° F. of about 674 grams.

For some applications, such as for restraining smaller loads, yarns having other deniers of 1300 or 1000 can be used. A yarn having a denier of 1300 has a creep of less than about 2 percent at 20 percent of breaking load after 4.5 hours, a maximum elongation at break of about 9.9%, a break load of about 23.1 pounds, a hot air shrinkage at 350° F. of about 7.3% and a shrinkage force at 350° F. of about 483 grams. Further, the yarn having a denier of 1000 has a creep of less than about 2 percent at 20 percent of breaking load after 4.5 hours, a maximum elongation at break of about 10.0%, a break load of about 17.7 pounds, a hot air shrinkage at 350° F. of about 7.0% and a shrinkage force at 350° F. of about 391 grams. This data was obtained using a break load test on a tensile tester with the yarn having a twist of 2 turns per inch. The test speed was 12 inches per minute. The gage length was 10 inches and the yarn was pre-tensioned to 30 grams. The hot air shrinkage data was collected using a hot air oven without preload with a dwell time of 30 minutes. Further, the shrinkage data was collected using a 0.05 grams per denier preload for 3 minutes.

A strap formed of yarn having the characteristics set forth above restrain freight from movement. Further, the specified creep allows the composite restraint straps 22 to restrain freight without need of secondary straps to hold the composite restraint straps 22 in place. For instance, the yarn within composite restraint strap 22 enables composite restraint strap 22 to restrain freight without the need for additional straps to hold composite restraint strap 22 in place in the event the strap experiences a heavy load causing freight to shift and the strap to elongate. In other words, many straps are known in the art that require pieces of tape for holding a strap in position in the event that the strap over-elongates and slack is formed in the strap because its material does not recover well. Without these pieces of tape, the strap falls out of position. In contrast, the specified recoverability of this invention, as shown by the small amount of creep, eliminates this need for tape to hold the strap in position. This advantage not only reduces the material costs involved with shipping freight, but also reduces labor costs associated with placing pieces of tape on the straps.

In one embodiment, the yarn forming the first layer 28 is chemically and physically stable and resistant to or protected from aqueous solutions, inorganic acids, organic acids, alkalis, organic chemicals (solvents), fuels, fertilizers, plasticizers, sealing compounds, high energy radiation, microorganisms, and gases such as chlorine, hydrogen chloride, sulfur dioxide and ammonia. The strength of the composite restraint strap 22 may be varied according to customer or industry requirements by changing the denier of the yarn used without changing the performance of the yarn. A yarn meeting all of these specifications is manufactured by KOSA, Technical Filament Division, Charlotte, N.C., as Type 792 having deniers of 1000, 1300, and 1500.

The second layer 30 is composed of spunbonded fibers, which are small diameter fibers formed by extruding thermoplastic material through one or more extruders attached to one or more banks made up of at least transfer piping and spinplates. The banks produce molten thermoplastic material as filaments from a plurality of fine, usually circular, capillaries in a spinneret with the diameter of the extruded filaments then being rapidly reduced as, for example, in Appel et al., U.S. Pat. No. 4,340,563; Matsuki, et al., U.S. Pat. No. 3,802,817; Dorschner et al., U.S. Pat. No. 3,692,618; Kinney, U.S. Pat. Nos. 3,338,992 and 3,341,394; Hartman, U.S. Pat. No. 3,502,763; and Dobo et al., U.S. Pat. No. 3,542,615. Spunbonded fibers are generally not tacky when they are deposited onto a collecting surface. Spunbonded fibers are generally continuous and have average diameters (from a sample of at least 10) larger than 7 microns, more frequently, between about 10 and 40 microns. The resulting matt of fibers is then bonded to form a strong neckable fabric. This bonding may be performed by ultrasonic bonding, chemical or adhesive bonding, thermal bonding, needle punching, hydroentangling and the like. Preferably, the second layer 30 is a spunbonded fiber, such as TREVIRA, manufactured by KOSA, Technical Filament Division, Charlotte, N.C. During use of the composite restraint strap 22, the properties of the second layer 30 are such that the second layer 30 expands with the yarn composing the first layer 28 and remains attached to the first layer 28 during the expansion when the composite restraint strap 22 experiences heavy loads.

Figure 4:
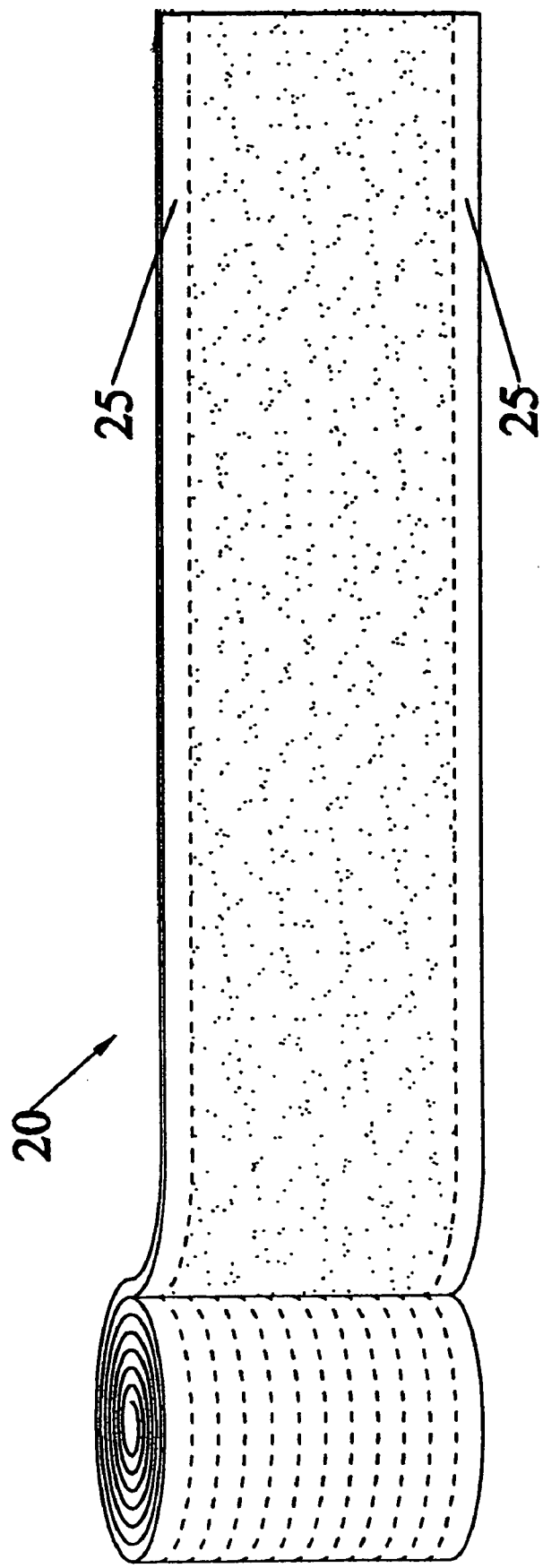
FIG. 4 is a perspective view of a composite restraint strap including a finger edge formed by a first layer being wider than a second layer.

The composite restraint strap 22 preferably includes an adhesive layer 31 capable of adhering to an unclean floor surface of a transportation device, as shown in FIG. 3. The adhesive is capable of adhering to many types of material, including, but not limited to, wood, metal, plastic, fiberglass and painted surfaces. The adhesive layer 31 is typically located in the middle portion of the composite restraint strap 22 for a distance sufficient to restrain the product from vertical movement. Additionally, the adhesive layer 31 may be positioned on the composite restraint strap 22 so that a finger edge 25, as shown in FIG. 4, is present nearest each edge of the composite restraint strap 22. Alternatively, the finger edge 25 is located on a single edge of the strap 22 or a portion of a single edge of the strap 22. The finger edge 25 provides for easy application of the composite restraint strap 22 after the releasable film has been removed as the finger edge 25 provides an area where a user may grab the product without having to touch the adhesive itself.

Figure 5:
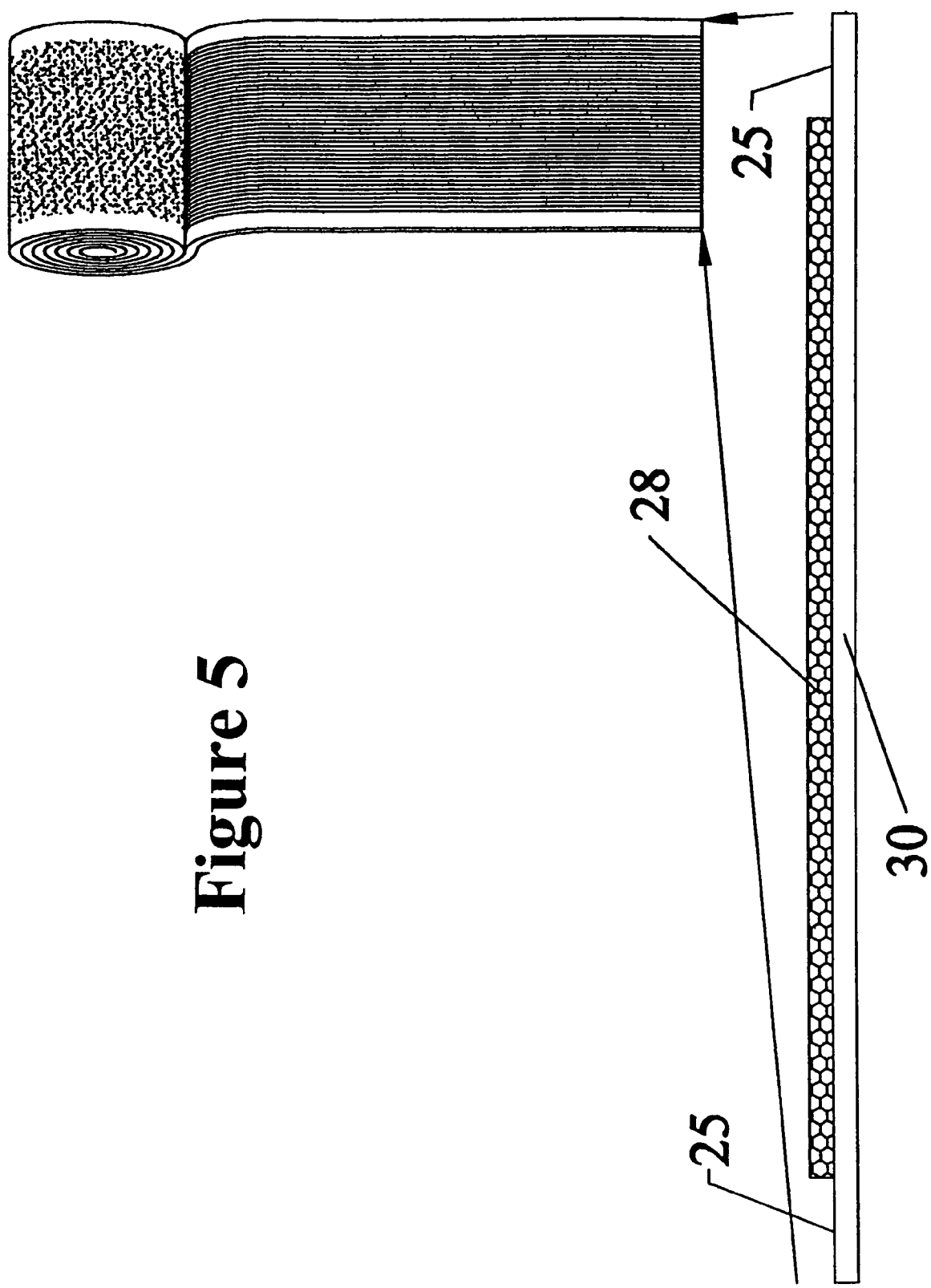
FIG. 5 is a cross-sectional view of a composite restraint strap including a finger edge formed by a first layer being wider than a second layer.

Preferably, the composite restraint strap 22 is eight inches in height and the adhesive is applied to a portion of the composite restraint strap 22 so that a finger edge 25 is formed. Further, it is preferable that the adhesive is applied on seven and a half inches of the width of the composite restraint strap 22 and positioned equidistant from the top and bottom edge of the strap. Alternatively, the second layer 30 may be wider than the first layer 28, as shown in FIGS. 4 and 5. In this embodiment, the finger edge 25 is formed by the discrepancies in width between the first layer 28 and the second layer 30. In this embodiment, adhesive is applied on the first layer 28 and not on the second layer 30.

The adhesive may be positioned on a composite restraint strap 22 at various locations along the composite restraint strap 22 based on a desired application, as determined by a customer or industry. It is desirable to position the adhesive so that no adhesive is wasted or unused. In one embodiment, the adhesive may be placed at the ends of a section of a composite restraint strap 22 that has been cut to the desired length. In another embodiment, the adhesive may be coextensively applied to a side of a composite restraint strap 22. Further, the adhesive may be applied to a surface of the composite restraint strap 22 during the manufacturing process, or anytime prior to use. If the adhesive is applied to the composite restraint strap 22 during the manufacturing process, a releasable film can be placed over the adhesive to prevent it from undesirably contacting itself or other surfaces before installation. The releasable film may include a plurality of perforations, or other similar items, enabling the releasable film to be removed from contact with the adhesive. Additionally, the releasable film allows the composite restraint strap 22 to be wrapped around a cylinder to form a roll for efficient packaging. Alternatively, the adhesive may be applied to the composite restraint strap 22 just before being attached to a floor.

II. Installation of Composite Restraint Strap

During use, a composite restraint strap is first secured to the floor 32 of the container 34 using gum-resin based adhesive. The adhesive may be applied to the floor 32 from a container using a roller, brush or other means for application. Alternatively, the adhesive may be located on the composite restraint strap 22 and protected with releasable film until it is desired that the composite strap 22 be adhered to the floor 32 of the container 34. Just before installation of the patch 26, the releasable film is removed to expose the adhesive. Once the composite restraint strap 22 has been positioned on the floor 22 of the container, as shown in FIG. 12, the freight is positioned on top of the composite restraint strap 22 and between the side walls 34 of the container 32, as shown in FIG. 13.

A first end 40 of the composite restraint strap 22 is positioned atop and in contact with the freight. A second end 42 of the composite restraint strap 22, opposite the first end 40, is positioned atop the first end of the composite restraint strap 22, as shown in FIG. 14. The tensioning tool 24 is positioned on the intersection of the first and second ends, 40 and 42 respectively. The tensioning tool 24 is then rotated so that the composite restraint strap 22 is tightened around a load of freight. Once the composite restraint strap 22 has been tightened around the load of freight, the releasable film located on the patch 26 is removed.

Figure 15:
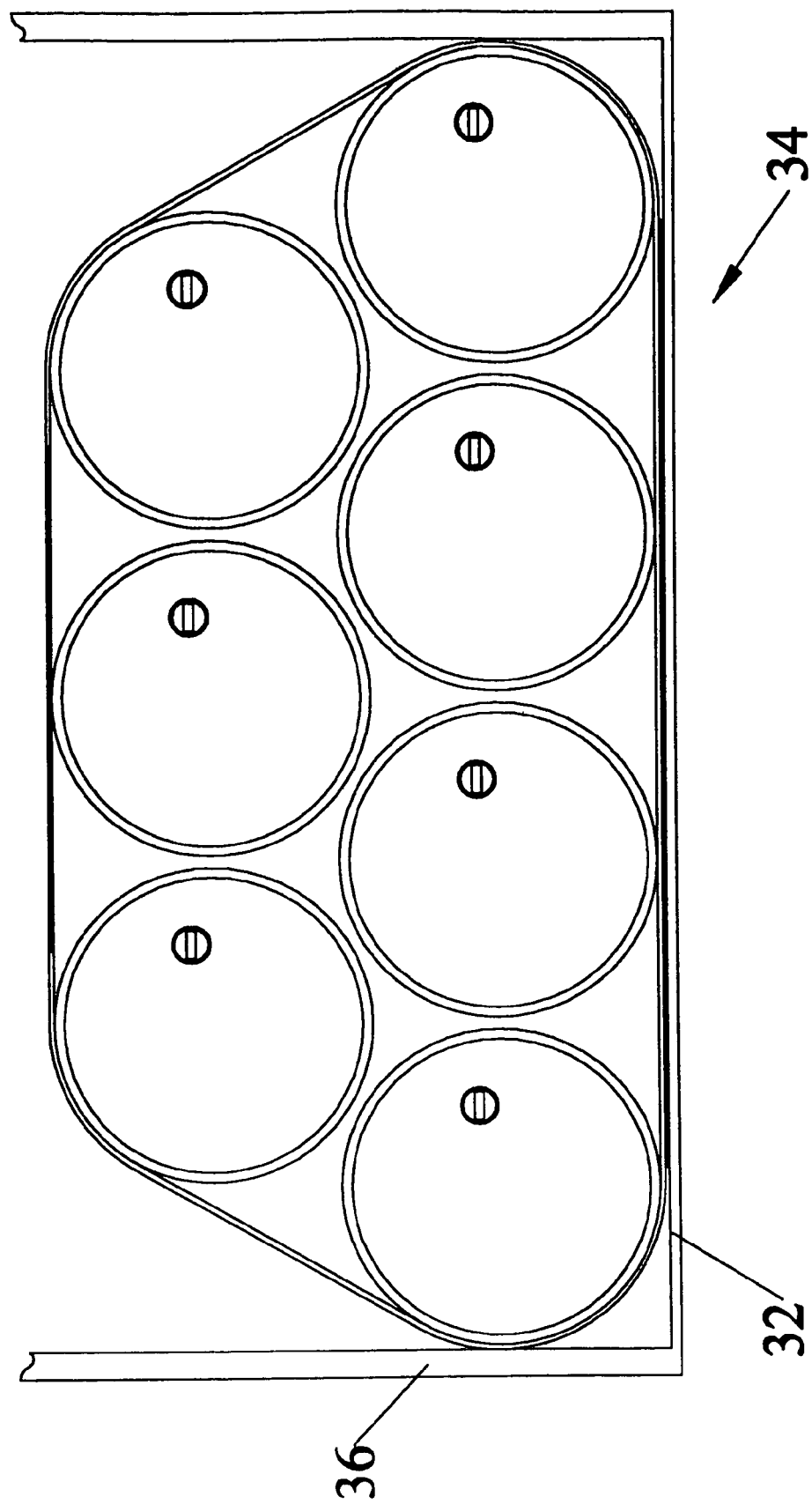

The patch 26 is adhered to the first end of the composite restraint strap 22 to prohibit the composite restraint strap 22 from losing tension after the tensioning tool 24 is removed, as shown in FIG. 15. The patch 26 is sized to stretch across the intersection between the ends of the composite restraint strap 22 a distance sufficient to prohibit the composite restraint strap 22 from losing tension once the strap 22 has been positioned around freight and tightened, and the tensioning tool 24 has been removed. Preferably, the patch 26 includes a non-releasable pressure sensitive adhesive covering the entire length of one side of the composite restraint patch 26, except for the finger edges 25, which are provided for easier handling. In another embodiment, the adhesive may be applied to the patch 26 in any design or manner which enables the patch 26 to hold the composite restraint strap 22 in tension as set forth above. Further, the adhesive may be applied to the patch 26 at the time of installation by the laborer installing the composite restraint system 20. After the patch 26 has been secured to the composite restraint strap 26, the tensioning tool 24 is removed from the intersection of the first and second ends, 40 and 42 respectively, of the composite restraint strap 22.

III. Strap with Pre-Attached Patch

In another embodiment, a strap 22 may include a patch 26 attached to the composite restraint strap 22 before installation of the strap 22 around freight, as shown in FIGS. 6-10. The patch 26 may be composed any material of sufficient strength to hold the ends of the strap 22 under tension. These materials may include, but are not limited to, the composite material described above, a non-woven fabric, such as a spunbonded fabric, or a woven fabric. In this embodiment, the patch 26 is attached to one end of the strap 22 at a contact section 29. The patch 26 may be attached using an adhesive, stitching, or thermal bonding. Alternatively, the patch 26 may be attached to the strap 22 during the spunbonded manufacturing process which produces strap 22 as described above. The patch 26 preferably contains a non-releasable adhesive. Alternatively, the adhesive may be a releasable type adhesive.

The patch 26 preferably extends from the strap 22 a distance sufficient to engage the other end of the strap 22 and to prevent the strap 22 from losing tension after being tightened around a load of freight. The patch 26 may or may not extend beyond the end of the strap 22 prior to installation. When the patch 26 is shorter, the strap 22 would be cut away, or otherwise removed during installation, to allow the patch 26 to be attached to another end of the strap 22.

In one embodiment, the patch 26 is about three feet in length, having approximately one end composed of a one foot section of the patch 26 attached to the strap 22 at contact section 29 and another end composed of a two foot section of the patch 26 having a portion that extends beyond the end of the strap 22. In another embodiment, the patch 26 may be shorter or longer than these dimensions based on the amount of strength needed to hold a particular load of freight. For example, the patch 26 may range from about one foot to about ten or more feet in length. While the length of the patch 26 may differ, its function and properties remain unchanged.

Figure 6:
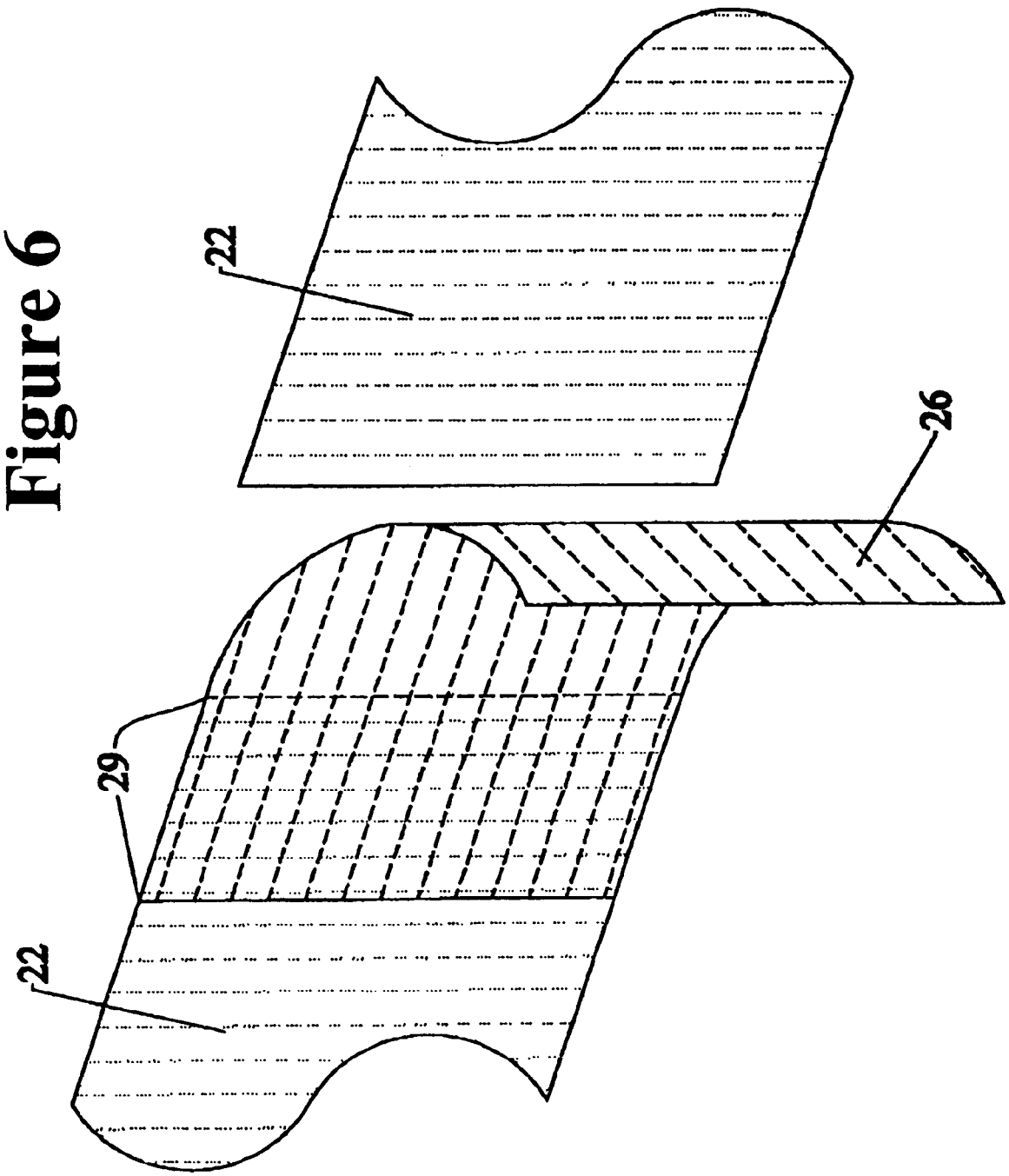
FIG. 6 through FIG. 9 depict installation of a strap, having a pre-attached patch, and a tensioning tool for use in such installation.
Figure 7:
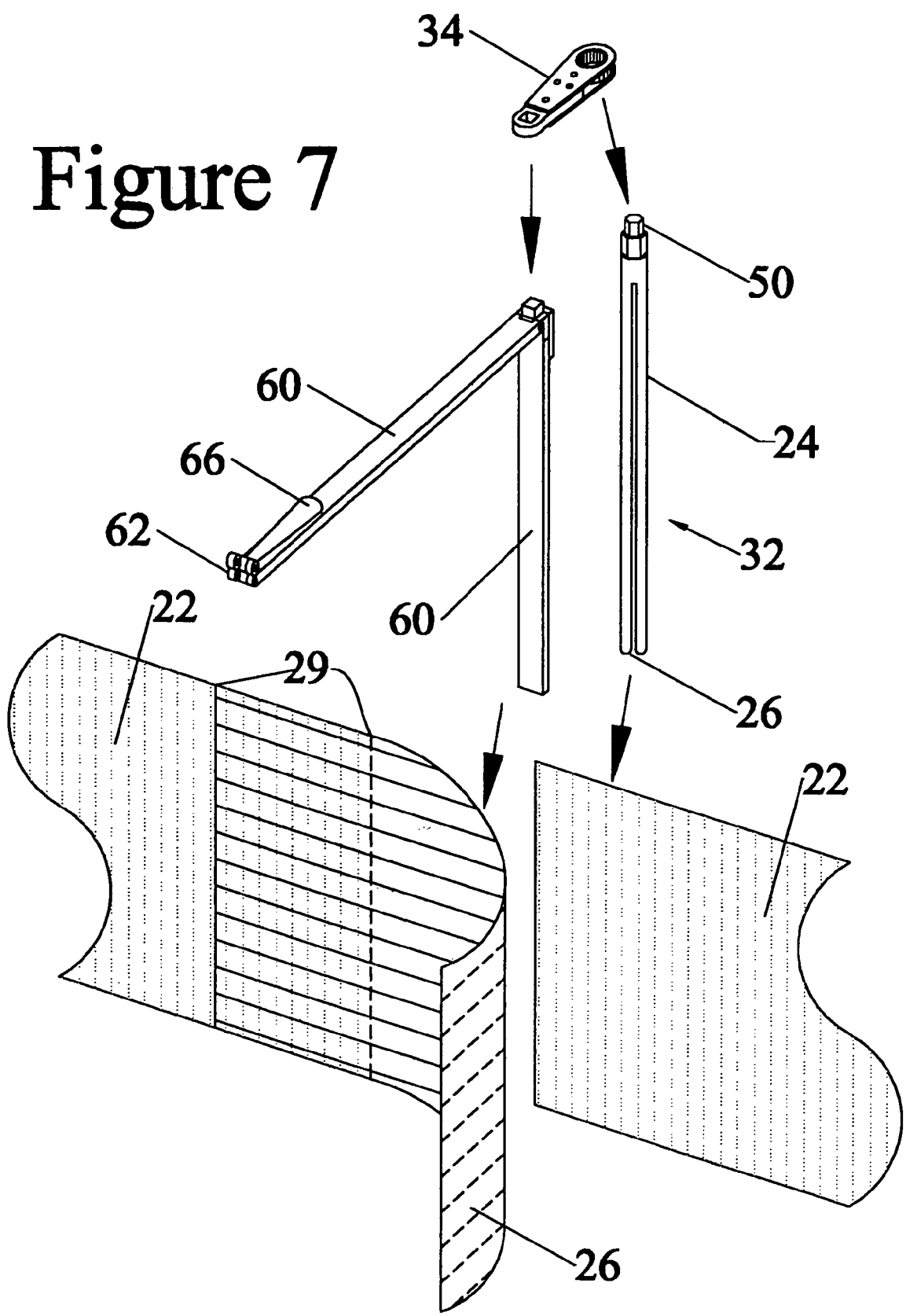
Figure 8:
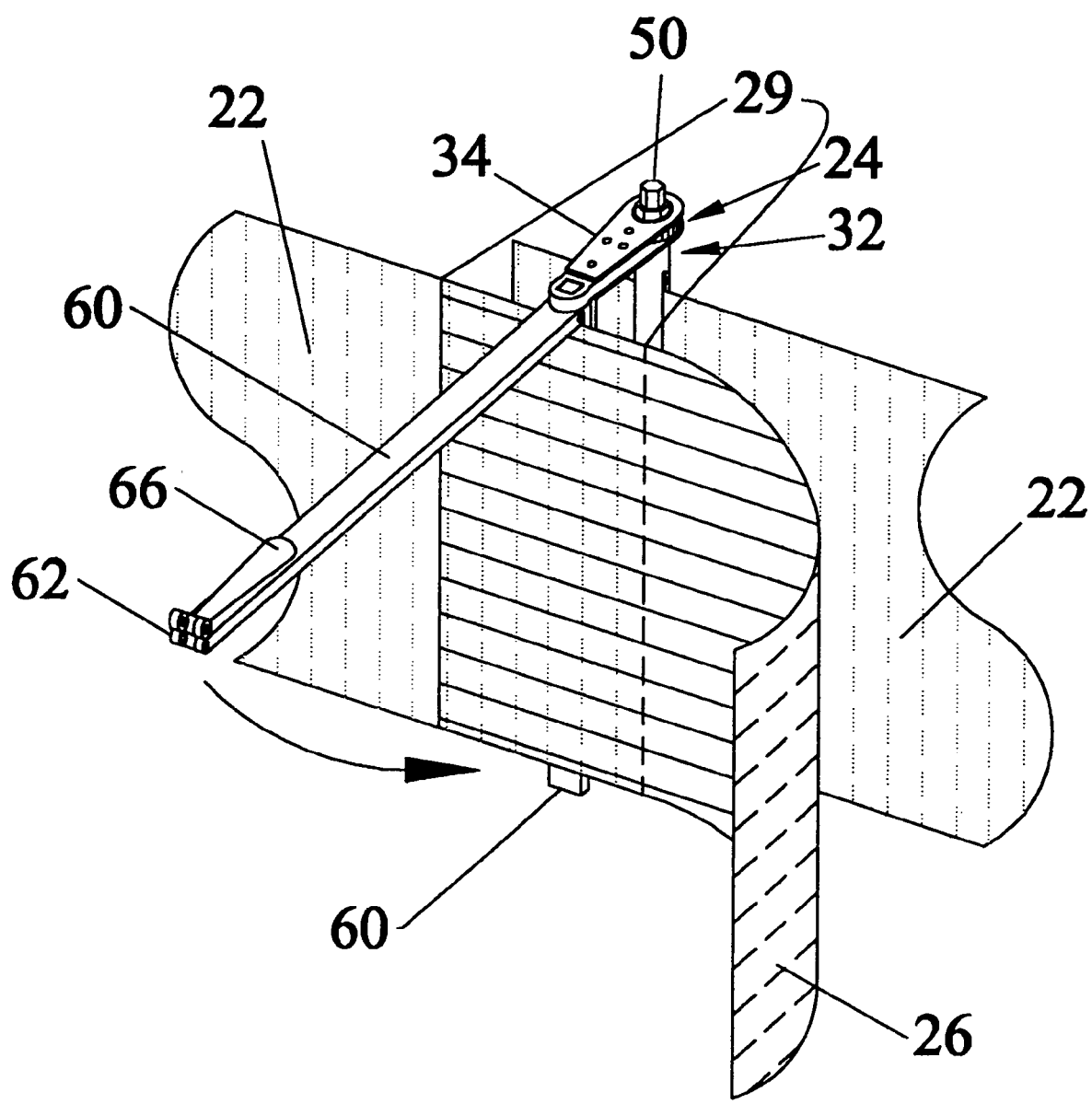
Figure 9:
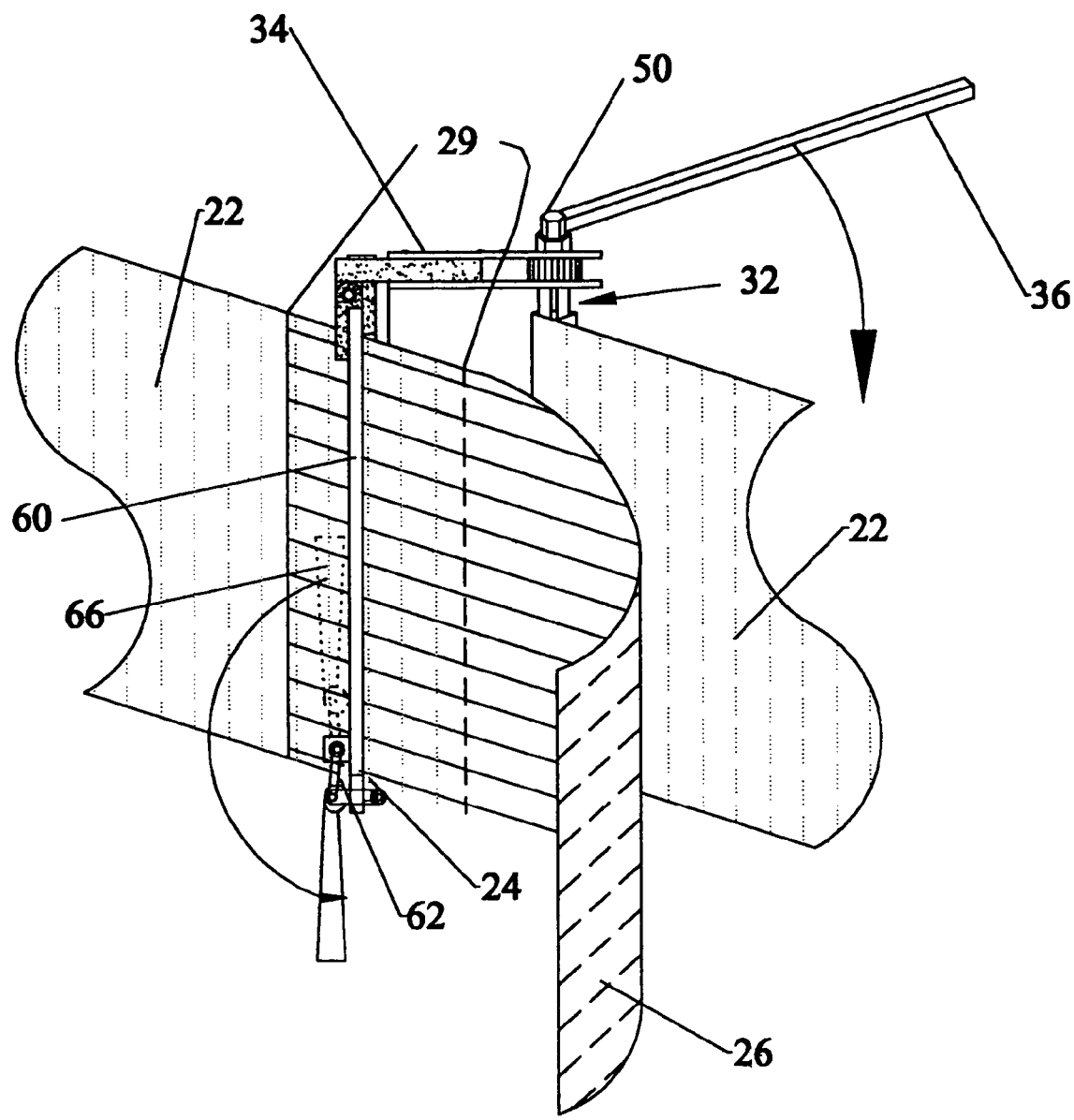
Figure 10:
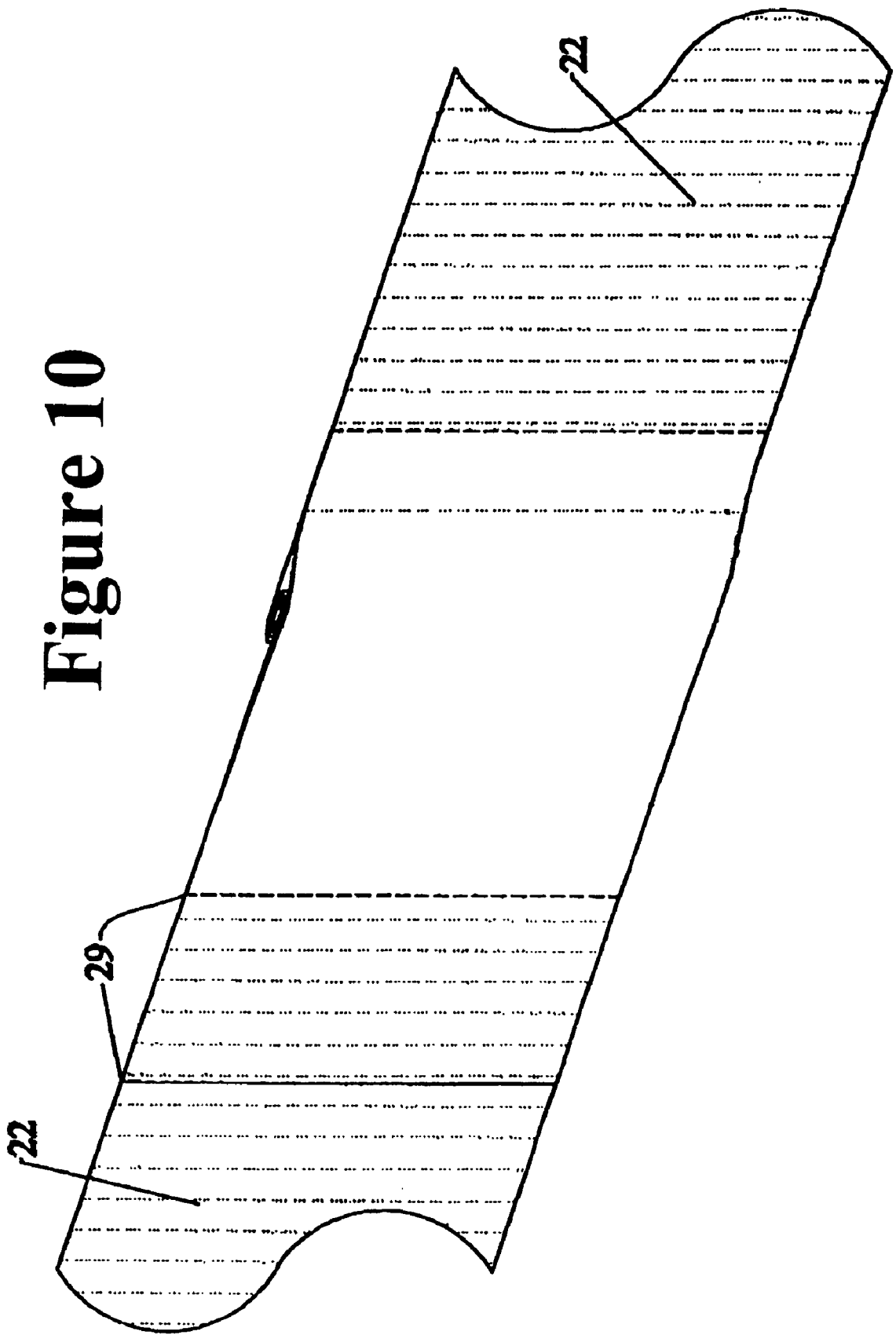
FIG. 10 shows a strap installed with a pre-attached patch.

In this embodiment, where a patch 26 is pre-attached to a strap 22 before installation, the patch 26 is installed as shown in FIGS. 6-10. After at least one strap 22 is adhered to a floor or wall of a transportation device and the freight positioned, the ends of the at least one strap 22 are overlapped to form an intersection, as shown in FIG. 6. These ends could be ends from a single strap 22 or ends from different straps 22. A tensioning tool 24 is placed over one end of strap 22 and the other end of strap 22 is secured within clamp arms 60 of tensioning tool 24, as shown in FIGS. 7 and 8. Once in place, the tensioning tool 24 is rotated until the strap is taut, as shown in FIG. 9. A releasable film is removed to expose an adhesive located on patch 26 and a free end of patch 26 is then adhered to the strap 22 and tensioning tool 24 removed, as shown in FIG. 10.

IV. Composite Strap with Reinforcement Strap

Figure 18A:
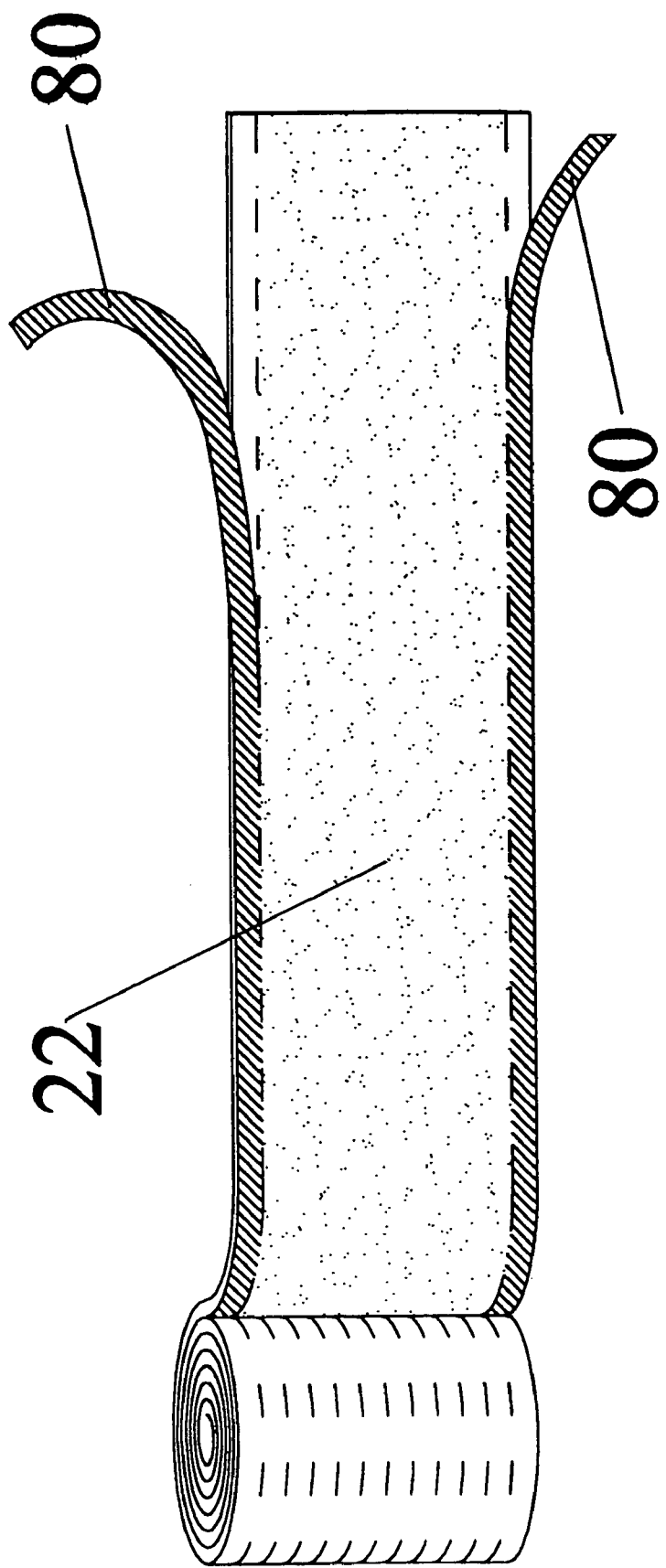
FIG. 18A is a perspective view of a composite restraint strap including two reinforcement straps.
Figure 18B:
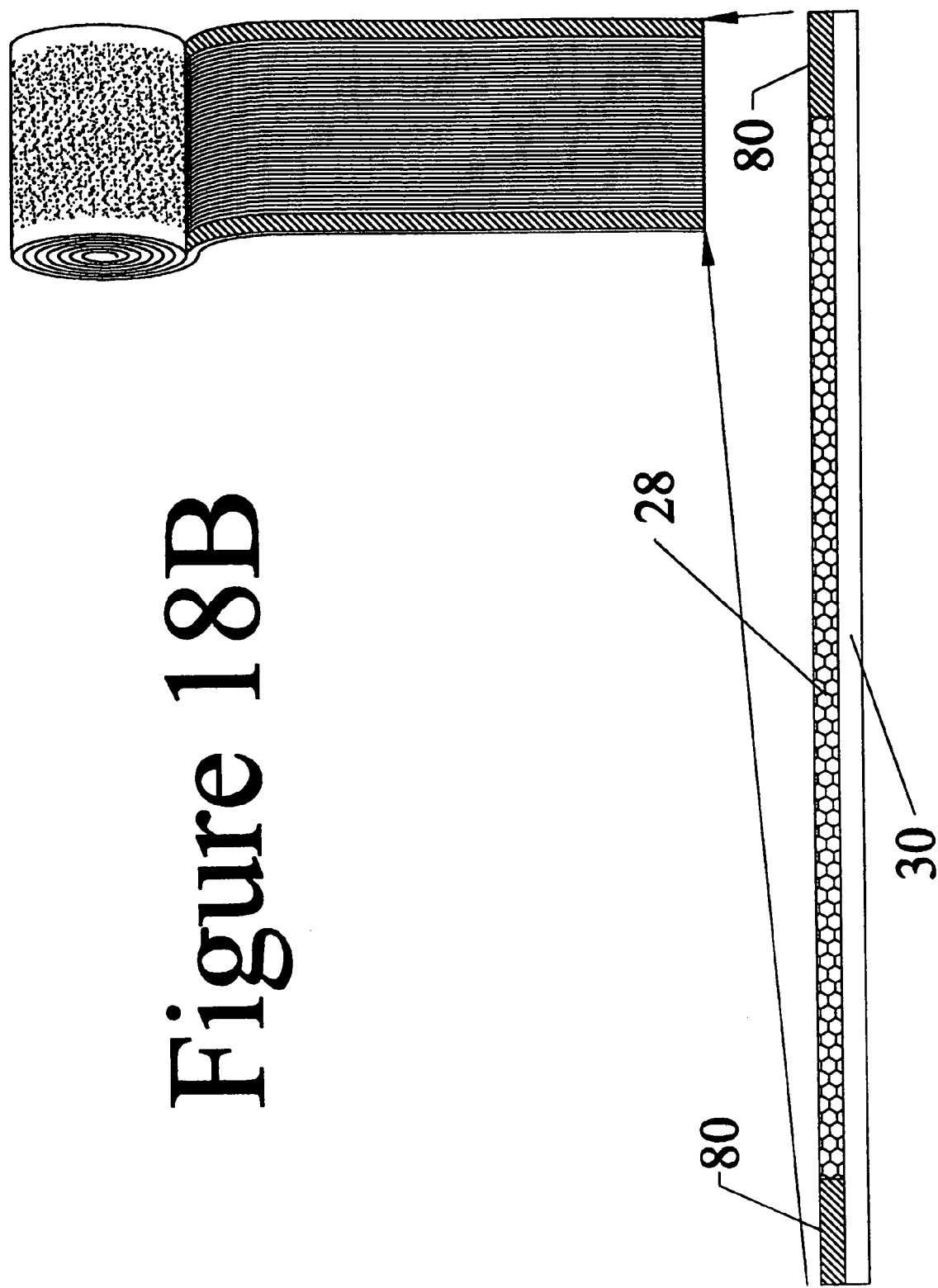
FIG. 18B is a cross-sectional view of a composite restraint strap including two reinforcement straps.

In another embodiment, composite restraint strap 22 includes a reinforcement strap 80. Reinforcement strap 80 can be composed of materials such as cord strap, steel bands, high strength plastics or others. The cord strap can have a width of 1¼ inches and an average strength of about 3953 pounds per foot, as determined in accordance with ASTM D3950-96 at 21 degrees Celsius and 65 percent relative humidity. The test was performed on a dynaometer with a constant rate of extension principle at a speed on 127 mm per minute. The length of reinforcement strap tested was 720 mm. Composite restraint strap 22 can include two reinforcement straps 80, as shown in FIG. 18. Reinforcement straps 80 are positioned proximate to the top and bottom edges of composite strap 22 and are attached to composite restraint strap 22 using a water based adhesive. In addition, reinforcement straps 80 are positioned generally parallel to the longitudinal axis of strap 22. Alternatively, reinforcement strap 80 can be attached to composite restraint strap 22 with stitching, thermal bonding, or other means. Furthermore, a single reinforcement strap 80 can be attached to composite restraint strap 22. Moreover, more than two reinforcement straps 50 can be attached to composite restraint strap 22.

Figure 19:
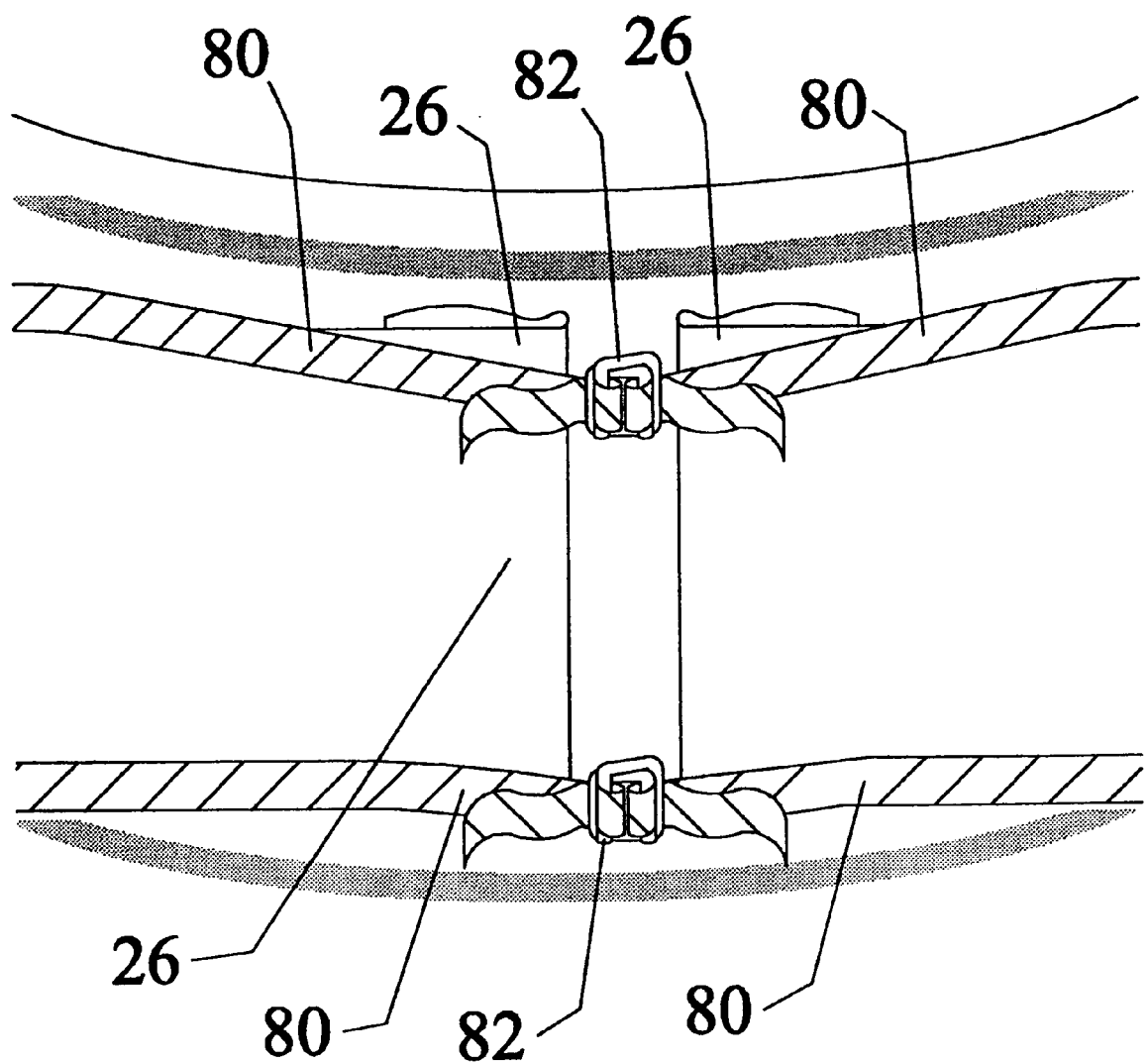
FIG. 19 shows two reinforcement straps whose ends are connected together using buckles.
Figure 20:
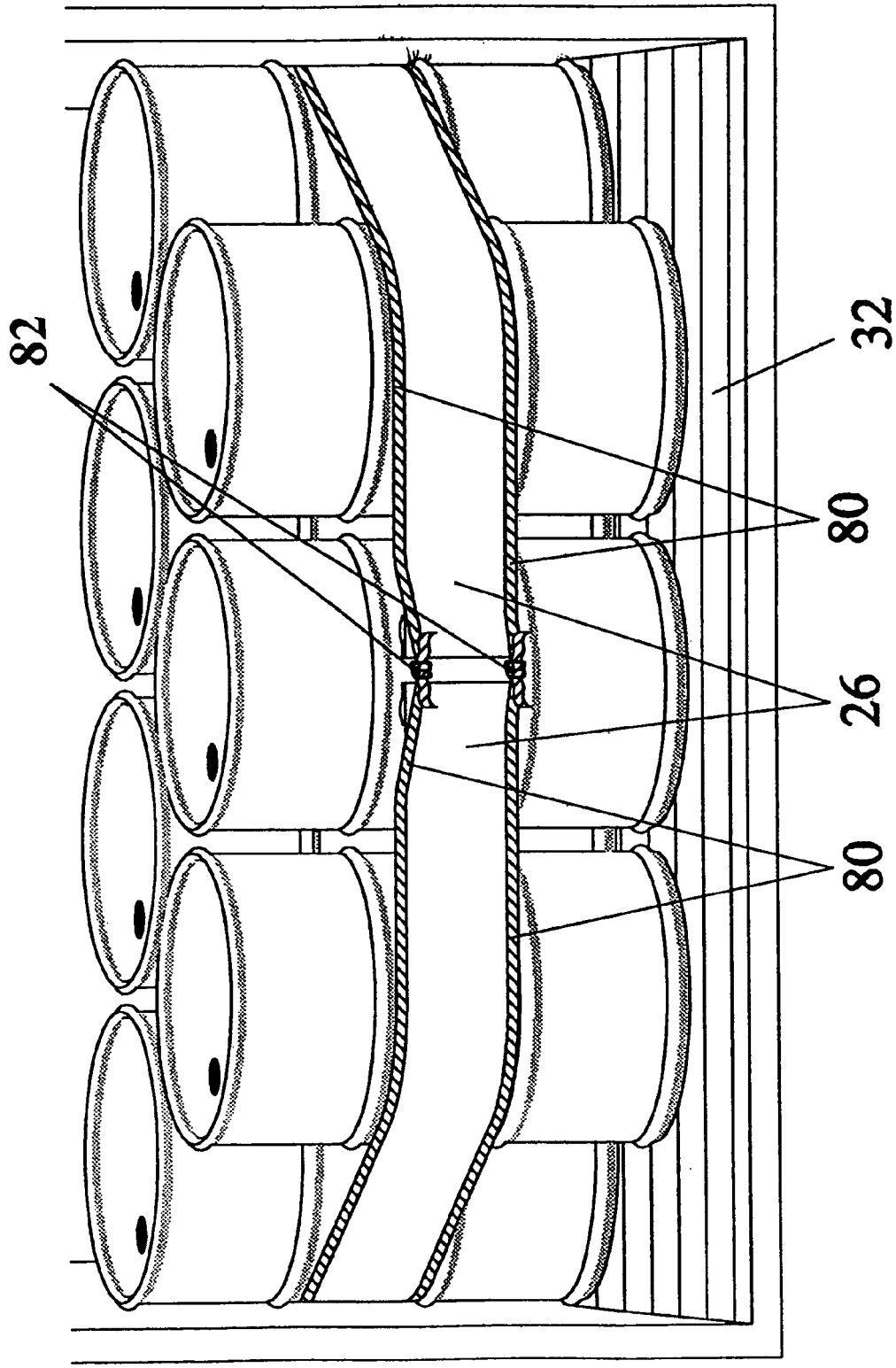
FIG. 20 shows a strap including two reinforcement straps secured around a load of freight.

Reinforcement straps 80 are used by peeling back end portions of the straps 80 from composite strap 22, as shown in FIG. 18. The ends of reinforcement straps 80 from a first end of composite strap 22 are connected with ends of reinforcement straps 80 from a second end of composite strap 22, as shown in FIG. 19. Reinforcement straps 80 can be connected together using a fastener 82, such as a buckle commonly referred to as an AVT 10 buckle, size –1¼ inch, cold-rolled steel buckle. A buckle such as a Cyclop Buckle #AVB-10A or a Formex Buckle B-10XTS can be used. Alternatively, another size or style of buckle can be used. Further, fastener 82 can include clamps or other such connectors. Ends of reinforcement strap 80 are pulled tight once inserted into a fastener. If reinforcement strap 80 is composed of a steel band, a clamp can be used to secure reinforcement strap 80 in position once taut. After reinforcement straps 80 have been secured, a patch 26 is attached to the first and second ends of composite restraint strap 22 across their intersection, as described above. A patch 26 can be used to secure various types of freight from movement in all directions, as shown in FIG. 20.

V. Tensioning Tool

The tensioning tool 24, as shown in FIG. 11A through 11D, has a body 32, a restraint arm 34, a clamp 35, and a torsion arm 36. Body 32 includes a plurality of prongs 33 forming a slot 37 for receiving at least one strap 22. Slot 32 essentially acts as a device for holding the strap 22 to allow it to be tensioned. Other devices exist that can hold strap 22 that include, but are not limited to, a releasable catch system, such as VELCRO, at least one clamp arm, an adhesive, and at least one clip. The adhesive can be releasable or permanent. Body 32 can be a cylindrical shaft as shown; however, body 32 can have a cross-section comprising any polygonal shape or two-sided shape. It is preferable that the length of the slot 37 be equal to or greater than the width of strap 22. Body 32 further includes a first head 50 and a second head 52. First head 50 and second head 52, shown generally with polygonal shapes. Preferably, the heads 50, 52 are sized to be a standard hexagonal head of the same or different sizes.

Torsion arm 36 may be any arm capable of being attached to first head 50. Torsion arm 36 may include, but is not limited to, a wrench, ratchet, or bar stock. In another embodiment, torsion arm 36 may be included as a part of body 32 of the tensioning tool 24. Body 32 is coupled to clamp 35 through restraint arm 34, which includes a first retention aperture 54 and a second retention aperture 56. First retention aperture 54 is sized to receive both first and second heads, 50 and 52 respectively, and to fit closely around second head 52. Second retention aperture 56 is sized to receive retention member 58 of clamp 35. Further, first retention aperture 54 can include a ratchet mechanism, allowing rotation in one direction but not in the reverse direction.

Figure 11D:
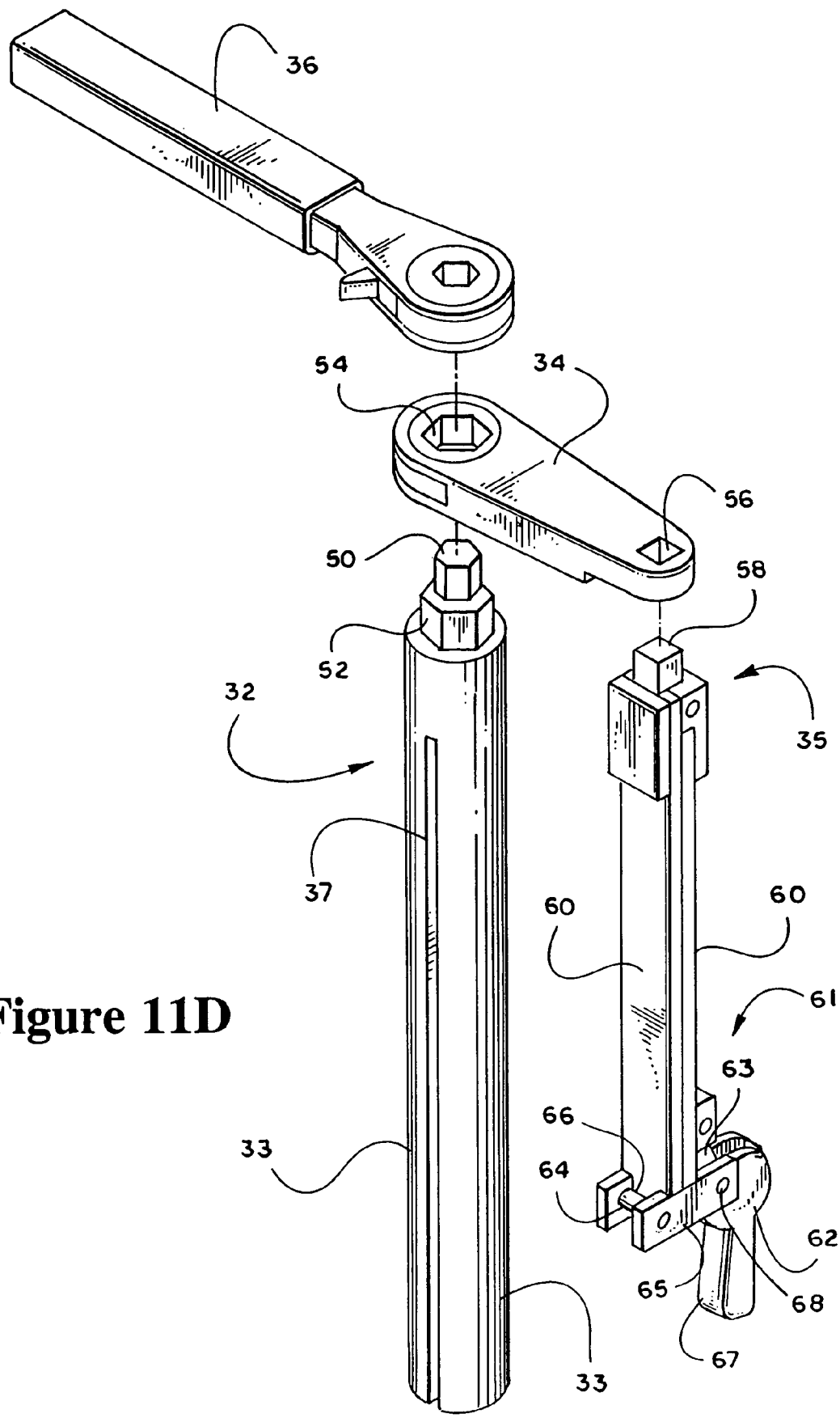
FIG. 11A is a perspective view of a tensioning tool according to the present invention.
FIGS. 11B and 11C are cross-sectional views showing embodiments of a cam of the tensioning tool having different seating mechanisms.

Clamp 35 includes a retention member 58, clamp arms 60, and locking apparatus 61. Retention member 58 can have any polygonal shape but is preferably a standard hexagonal head. Preferably, the length of clamp arms 60 are greater than the width of strap 22. However, the length of clamp arms 60 can be approximately equal to the width of strap 22. Locking apparatus 61 can include a cam 62 that is rotatably attached to clamp arm 60, and more particularly, cam 62 is attached to clamp arm 60 with positioning arm 63. Cam 62 is used to press clamp arms 60 together, as shown in FIG. 11D. Clamp arms 60 can be forced together to hold strap 22 within clamp arms 60 by first positioning locking arm 64 within groove 66. Locking arm 64 is coupled to cam 62 through cam arms 65. Handle 67 is rotated downwardly, causing cam 62 to rotate and to bear against an outer surface of clamp arm 60. As cam 62 is rotated, cam 62 forces axis 68 to move away from and generally orthogonal to the longitudinal axis of clamp arms 60. This movement causes clamp arms 60 to be forced together to hold strap 22.

After clamp arms 60 have been pressed together with cam 62, arms 60 are held together by cam 62. Further, as shown in FIGS. 11B and 11C, clamp arms 60 are held together by cam 62. Specifically, as shown in FIG. 11B, cam 62 can include a flat portion 70 that prevents cam 62 from rotating and thereby allowing clamp arms 60 to separate. In another embodiment, as shown in FIG. 11C, cam 62 includes a raised portion 72 that is capable of being received by a detent 74 located on an exterior surface of clamp arm 60. Detent 74 is positioned so that once handle 67 and cam 62 are rotated, causing clamp arms 60 to press against each other, the raised portion 72 on cam 62 seats within the detent 74 to prevent cam 62 from rotating and allowing clamp arms 60 to release strap 22.

In an alternative embodiment, body 32, restraint arm 34, and clamp 35 are not separate parts but rather are a single unit. For instance, the single unit can be formed by methods such as casting, injection molding, or milling. Further, the parts can be made from materials including, but not limited to, plastic or metals such as aluminum, steel, or brass, or any combination thereof. Moreover, locking arm 64 and cam arms 65 can be a single unit rather than individual parts rotatably connected.

Tensioning tool 24 is simple to use. In fact, a single person can operate tensioning tool 24 to tighten and secure strap 22 around a load of freight. For instance, a strap 22 can be secured with tensioning tool 24 by first inserting slot 37 of body 32 onto a first end of strap 22, as shown in FIGS. 6 and 7. Then, a second end of strap 22 can be secured by placing a second end of strap 22 between clamp arms 60, as shown in FIG. 8. Locking arm 64 is then placed within groove 66 and cam 62 is rotated, thereby tightening clamp arms 60 around strap 22. Cam 62 is held in this actuated position using either a flat side 70 or a raised portion 72, as described above. The second end of strap 22 can be the end of the same strap 22 having the first end or it could be an end of a different strap 22. Restraint arm 34 is then attached to body 32 at second head 52 and attached to clamp 35 at retention member 58. Torsion arm 36 is attached to body 32 at first head 50. Strap 22 is tightened by rotating torsion arm 36, as shown in FIG. 9, which causes second end of strap 22 to wind around the outside surface of body 32. Further, while torsion arm 36 is rotated, clamp arms 60 hold first end of strap 22.

Once tensioning tool 24 has tightened strap 22 around a load of freight, the first end of strap 22 is attached to the second of strap 22. As described above, this can be accomplished in numerous manners. For instance, a patch 26 can be used to adhere the two ends together. If a patch 26 that is not pre-attached top strap 22 is used, the patch 26 is attach to the second end of strap 22 and then to the first end of strap 22, but not on top of clamp arm 60. Once a portion of the first end of strap 22 has been attached to patch 26 sufficient to hold strap 22 tight, cam 62 is rotated to release strap 22 from within clamp arms 60. Tensioning tool 24 is then removed from contact with strap 22 and the remaining unattached portion of patch 26 is attached to the first end of strap 22. If a strap having a pre-attached patch 26 is used, it is not necessary to adhere patch 26 to strap 22 in multiple steps. Instead, patch 26 can be adhered after strap 22 has been sufficiently tightened because the patch 26 is located between clamp arms 60 and needs only to be attached to the other end of the strap 22 to secure it.

On the other hand, if patch 26 is not used, the first end of strap 22 can be used to secure strap 22 tightly around a load of freight. For example, after strap 22 has been tightened, as described above, the first end of strap 22 can be attached to the second end of strap 22 by removing a releasable film and thereby revealing an adhesive that can attach each end together, by placing an adhesive on an end and attaching the ends together, or by other methods that are discussed above. Once the first end is attached to the second end, the strap 22 has been secured and tensioning tool 24 can be removed.

VI. Exemplary Uses of the Composite Restraint System

Figure 16:
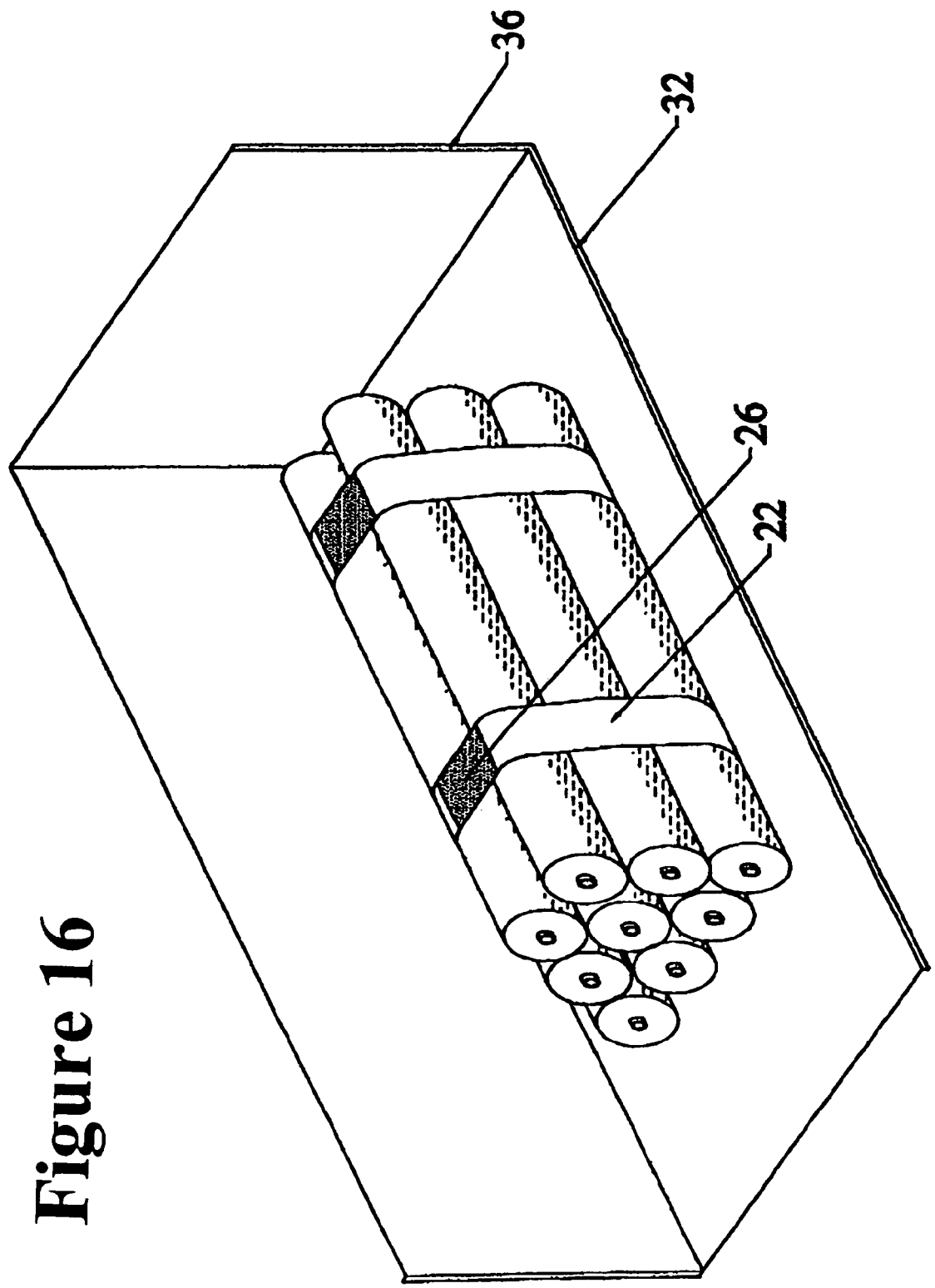
FIG. 16 shows the containment restraint system securing freight composed of rolls of carpet.

The composite restraint system 20 may be used to position freight composed of numerous items. For instance, the composite restraint system may be used to restrain freight including, but not limited to, drums, as shown in FIGS. 12-15, carpet rolls, as shown in FIG. 16, rolls of paper, rolls of fabric, tubes, pipes, rods, poles, lumber, boxes, and pallets containing various items of freight.

The composite restraint strap 22 can be used to secure freight to a floor or a wall of a transportation device. Further, only one composite restraint strap 22 or a plurality of composite restraint straps 22 may be used to secure a load of freight. In one embodiment of the composite restraint system 20, the composite restraint straps 22 may be used to secure a plurality of fifty-five gallon containment drums from vertical and lateral movement, as shown in FIGS. 12-15.

In another embodiment, at least two composite restraint straps 22 may be used in tandem to secure a load of freight to a surface within a transportation device. For instance, as shown in FIG. 17, at least two composite restraint straps 22 may be used to secure a load of freight to the walls of a transportation device. Alternatively, the at least two straps 22 may be used to secure a load of freight to the floor of a transportation device.

VII. Loading Procedures

While FIGS. 12-15 depict the composite restraint system 20 as used to restrain an entire load of freight, the composite restraint system 20 may be used to restrain only a portion of the load of freight in order to allow for easier delivery of freight when partial deliveries of freight are to be made at different locations. For instance, if the two top rolls of carpet and the three middle rolls of carpet shown in FIG. 10 are to be delivered to a first destination and the four bottom rolls of carpet are to be delivered to a second location, a composite restraint strap 22 may be secured around the four bottom rolls of carpet and a second composite restraint strap 22 may be secured around the top and middle rows. Using the composite restraint system 20 in this fashion allows the first load of freight, composed of the top and middle rows of carpet, to be unloaded at the first destination without having to re-secure the four bottom rolls of carpet before traveling to the second destination.

In another embodiment, the composite restraint system 20 may be used to secure items by wrapping a composite restraint strap 22 around the perimeter of freight, as shown in FIG. 1. The composite restraint system 20 may be used to restrain the freight using a single composite restraint strap 22, as depicted, or a plurality of straps, as shown in FIG. 17.

While various embodiments of this invention have been described above, these descriptions are given for purposes of illustration and explanation. Variations, changes, modifications and departures from the systems and methods disclosed above may be adopted without departure from the spirit and scope of this invention. For instance, composite restraint strap 22 can be formed in other shapes and sizes than shown in the Figures. Further, tensioning tool 24 can be made of different shapes and sizes than the embodiment depicted herein.

I claim:

1. A strap and patch combination for restraining freight, comprising:
   a. a strap with a first layer and a second layer, the first layer comprising a first end and a second end, and the second layer comprising a plurality of strands of yarn, wherein the yarn has an elongation characteristic ranging from about 2.5 percent to about 4.7 percent before breaking and a creep of less than about 2 percent after elongation, wherein the strap can be secured around freight to create an intersection between the first end of the strap and the second end of the strap, and wherein the strap can be placed under tension; and
   b. a separate patch comprising a third end and a fourth end, wherein the third end is pre-attached to the strap at a contact section near the first end prior to installation around the freight, and wherein the separate patch can be joined to the first end of the strap and to the second end of the strap.

2. The strap and patch combination of claim 1, wherein the first layer is a nonwoven fabric.

3. The strap and patch combination of claim 2, wherein the nonwoven fabric is a spunbonded, polyester, nonwoven fabric.

4. The strap and patch combination of claim 1, wherein the strap further comprises a third layer defining a releasable adhesive located on at least a portion of an outer surface of the strap for attachment to a surface of a transportation device.

5. The strap and patch combination of claim 1, further comprising an adhesive layer located on at least a portion of the patch for attachment to the second end of the strap.

6. The strap and patch combination of claim 5, wherein the adhesive is non-releasable.

7. The strap and patch combination of claim 1, wherein the patch is attached to the strap using an adhesive, stitching or thermal bonding.

8. The strap and patch combination of claim 1, further comprising at least one reinforcement strap coupled to the strap and positioned generally parallel to a longitudinal axis of the strap.

* * * * *